US009933216B2

(12) United States Patent
Schatz et al.

(10) Patent No.: US 9,933,216 B2
(45) Date of Patent: *Apr. 3, 2018

(54) HEAT EXCHANGER

(71) Applicant: Modine Manufacturing Company, Racine, WI (US)

(72) Inventors: Harald Schatz, Reutlingen (DE); Stefan Muller-Luft, Leonburg (DE); Ingo Heitel, Stuttgart (DE); Omur Acar, Filderstadt (DE); Jorg Soldner, Ehningen (DE); Michael Daniel, Neuhausen (DE); Bjorn Volquardsen, Schiltach (DE)

(73) Assignee: Modine Manufacturing Company, Racine, WI (US)

( * ) Notice: Subject to any disclaimer, the term of this patent is extended or adjusted under 35 U.S.C. 154(b) by 490 days.

This patent is subject to a terminal disclaimer.

(21) Appl. No.: 14/577,018

(22) Filed: Dec. 19, 2014

(65) Prior Publication Data

US 2015/0129167 A1    May 14, 2015

Related U.S. Application Data

(63) Continuation of application No. 12/896,651, filed on Oct. 1, 2010, now Pat. No. 8,978,740, which is a (Continued)

(30) Foreign Application Priority Data

Jun. 22, 2006 (DE) .................. 10 2006 028 578

(51) Int. Cl.
*F28F 9/013* (2006.01)
*F28D 7/16* (2006.01)
(Continued)

(52) U.S. Cl.
CPC ............ *F28F 9/0137* (2013.01); *B23P 15/26* (2013.01); *F28D 7/1684* (2013.01); *F28F 9/00* (2013.01);
(Continued)

(58) Field of Classification Search
CPC ...... F28F 9/0135; F28F 9/0136; F28F 9/0132; F28F 9/0133; F28F 9/0131; F28F 9/0239;
(Continued)

(56) References Cited

U.S. PATENT DOCUMENTS

| 1,304,496 A | 5/1919 | Blanding |
| 1,541,519 A | 6/1925 | McKee |

(Continued)

FOREIGN PATENT DOCUMENTS

| CN | 1685192 A | | 10/2005 | |
| CN | 1761809 A | * | 4/2006 | ........... F28D 7/0075 |

(Continued)

OTHER PUBLICATIONS

Office Action from SIPO for Chinese Application 200710106787.X dated Mar. 11, 2010 (7 pages).

(Continued)

*Primary Examiner* — Tho V Duong
(74) *Attorney, Agent, or Firm* — Michael Best & Friedrich LLP

(57) ABSTRACT

A heat exchanger includes a bundle of tubes, which can be inserted into a tubular housing. Exhaust gas can flow through the tubes. A coolant duct can be arranged between the tubes. The bundle of tubes can have at least one grid-like securing structure which supports the bundle in the housing. The behavior of the heat exchanger with respect to vibrations is affected by outwardly curved metallic springs attached to the bundle of tubes which may be deformed in the opposite direction to the insertion direction of the bundle (Continued)

into the housing. The spring force is directed against the housing in order to dampen vibrations. The heat exchanger can also include an elastic device for permitting a change in length caused by temperature changes.

20 Claims, 17 Drawing Sheets

Related U.S. Application Data continuation-in-part of application No. 11/764,491, filed on Jun. 18, 2007, now Pat. No. 8,033,323, and a continuation-in-part of application No. 12/696,986, filed on Jan. 29, 2010, now Pat. No. 9,403,204.

(51) Int. Cl.
  *F28F 9/00* (2006.01)
  *F28F 9/02* (2006.01)
  *F28F 9/26* (2006.01)
  *B23P 15/26* (2006.01)

(52) U.S. Cl.
  CPC ............ *F28F 9/013* (2013.01); *F28F 9/0219* (2013.01); *F28F 9/26* (2013.01); *F01N 2240/02* (2013.01); *F28F 2265/26* (2013.01); *F28F 2265/30* (2013.01); *Y10T 29/49361* (2015.01)

(58) Field of Classification Search
  CPC .......... F28F 9/0219; F28F 9/26; F28F 9/0137; F28F 9/00; F28D 1/0535; F28D 7/1684; F02M 26/32; B23P 15/26; Y10T 29/49361; F01N 2240/02
  USPC ......................................................... 165/162
  See application file for complete search history.

(56) References Cited

U.S. PATENT DOCUMENTS

| | | |
|---|---|---|
| 1,600,013 A | 9/1926 | Price |
| 1,655,086 A | 1/1928 | Blanding |
| 1,803,035 A | 4/1931 | Potter |
| 1,845,005 A | 2/1932 | Schellens |
| 1,918,601 A | 7/1933 | Jacocks et al. |
| 2,070,427 A | 2/1937 | Faunce |
| 2,297,165 A * | 9/1942 | Ringel ................ F22G 3/009 138/112 |
| 2,493,969 A * | 1/1950 | James .................. F28F 9/22 165/158 |
| 2,595,822 A | 5/1952 | Uggerby |
| 2,873,098 A | 2/1959 | Morgan |
| 2,969,956 A | 1/1961 | Forgo |
| 3,012,761 A | 12/1961 | Gardner et al. |
| 3,244,226 A * | 4/1966 | Hettrich, Jr. .......... F28F 9/0229 165/135 |
| 3,318,375 A | 5/1967 | Linder et al. |
| 3,804,161 A | 4/1974 | Nowak |
| 3,998,268 A * | 12/1976 | Sagan .................. F28F 9/0132 122/510 |
| 4,208,529 A | 6/1980 | Murray |
| 4,215,745 A | 8/1980 | Tuckmantel |
| 4,254,826 A | 3/1981 | Adams |
| 4,265,301 A | 5/1981 | Anderson |
| 4,426,965 A | 1/1984 | Patel |
| 4,596,285 A | 6/1986 | Dinulescu |
| 4,733,722 A * | 3/1988 | Forbes .................. F28F 9/00 165/158 |
| 4,768,585 A | 9/1988 | Hayes et al. |
| 4,770,234 A | 9/1988 | Hiraoka et al. |
| 4,834,173 A | 5/1989 | Weiss et al. |
| 5,388,638 A | 2/1995 | Gentry |
| 5,644,842 A * | 7/1997 | Coleman ............. B21D 53/085 29/890.044 |
| 5,915,472 A * | 6/1999 | Takikawa ............. F28D 7/1607 165/158 |
| 6,016,865 A | 1/2000 | Blomgren |
| 6,089,313 A | 7/2000 | Levy et al. |
| 6,244,256 B1 | 6/2001 | Wall et al. |
| 6,260,609 B1 | 7/2001 | Takahashi |
| 6,340,051 B1 | 1/2002 | Bloksma |
| 6,612,293 B2 | 9/2003 | Schweinzer et al. |
| 6,718,956 B2 | 4/2004 | Klipfel et al. |
| 6,874,572 B2 | 4/2005 | Wanni et al. |
| 6,920,918 B2 | 7/2005 | Knecht et al. |
| 7,077,114 B2 | 7/2006 | Husges |
| 7,080,634 B2 | 7/2006 | Yamashita |
| 7,171,956 B2 | 2/2007 | Igami et al. |
| 7,182,074 B1 | 2/2007 | Redon et al. |
| 7,185,642 B1 | 3/2007 | Redon et al. |
| 7,213,639 B2 | 5/2007 | Danielsson et al. |
| 7,380,544 B2 | 6/2008 | Raduenz et al. |
| 7,527,088 B2 | 5/2009 | Hayashi et al. |
| 8,002,022 B2 | 8/2011 | Geskes |
| 8,011,422 B2 | 8/2011 | Yamazaki et al. |
| 8,033,323 B2 * | 10/2011 | Schatz ................. F28D 7/1684 165/162 |
| 2003/0000688 A1 | 1/2003 | Mathur et al. |
| 2003/0196785 A1 | 10/2003 | Knecht et al. |
| 2004/0226694 A1 | 11/2004 | Dilley et al. |
| 2006/0090880 A1 | 5/2006 | Sugihara et al. |
| 2006/0102321 A1 | 5/2006 | Shincho et al. |
| 2006/0196052 A1 | 9/2006 | Lesage |
| 2006/0201661 A1 | 9/2006 | Sugihara et al. |
| 2006/0201663 A1 | 9/2006 | Strahle et al. |
| 2006/0231243 A1 | 10/2006 | Sugihara et al. |
| 2007/0017661 A1 | 1/2007 | Geskes et al. |
| 2007/0131400 A1 | 6/2007 | Gracia et al. |
| 2007/0267000 A1 | 11/2007 | Raduenz et al. |
| 2008/0006398 A1 | 1/2008 | Schatz et al. |
| 2008/0202724 A1 | 8/2008 | Lorenz et al. |
| 2008/0202739 A1 | 8/2008 | Bartnecht et al. |
| 2008/0289804 A1 | 11/2008 | Baumann et al. |
| 2008/0302094 A1 | 12/2008 | Yoon |
| 2009/0113909 A1 | 5/2009 | Liu et al. |
| 2009/0194266 A1 | 8/2009 | Conrad et al. |
| 2011/0056652 A1 | 3/2011 | Neher et al. |

FOREIGN PATENT DOCUMENTS

| | | | |
|---|---|---|---|
| DE | 2046954 A1 * | 4/1971 | ................ F28F 1/20 |
| DE | 2339364 A1 | 2/1975 | |
| DE | 2828275 A1 * | 1/1980 | ............ F28F 9/0131 |
| DE | 3242619 A1 | 6/1983 | |
| DE | 3811961 A1 | 6/1989 | |
| DE | 19721132 A1 | 11/1997 | |
| DE | 10157285 A1 | 6/2003 | |
| DE | 10312788 A1 | 9/2004 | |
| DE | 102005054731 | 5/2007 | |
| EP | 1348924 A2 | 10/2003 | |
| EP | 1544564 A1 | 6/2005 | |
| EP | 1548386 A1 | 6/2005 | |
| EP | 2017455 | 1/2009 | |
| GB | 366849 A * | 2/1932 | ................ F28B 1/02 |
| JP | 7305987 | 11/1995 | |
| JP | 11013555 | 1/1999 | |
| JP | 11023182 | 1/1999 | |
| WO | 03001650 A1 | 1/2003 | |
| WO | 03/036214 | 5/2003 | |
| WO | 03064953 A1 | 8/2003 | |

OTHER PUBLICATIONS

Office Action from the Patent Office of the People's Republic of China for Application No. 200910135291.4 dated Mar. 1, 2012 (English Translation and Original, 19 pages).
Office Action from the United States Patent and Trademark Office for U.S. Appl. No. 12/464,200 dated Jun. 1, 2012 (9 pages).

(56) References Cited

OTHER PUBLICATIONS

Jinyuan et al., "Tube Vibration Reliability Design of Tubular Heat Exchangers for Thermal Systems of Steam Turbines," Proceedings of the Chinese Society for Electrical Engineering, Shanghai Power Equipment Research Institute, vol. 18, Apr. 1998, pp. 292-294.
Au-Yang, "The Crossing Frequency as a Measure of Heat Exchanger Suppoer-Plate Effectiveness," Journal of Fluids and Structures, Jan. 2002, vol. 16, Iss. 1, pp. 83-92.
Office Action from the United States Patent and Trademark Office for U.S. Appl. No. 11/764,491 dated Jan. 5, 2011 (13 pages).
Office Action from the United States Patent and Trademark Office for U.S. Appl. No. 12/696,986 dated Aug. 20, 2012 (21 pages).
Office Action from the United States Patent Office for U.S. Appl. No. 11/764,491 dated Aug. 2, 2010 (5 pages).
Office Action from the United States Patent and Trademark Office for U.S. Appl. No. 12/896,651 dated Feb. 5, 2014 (12 pages).

\* cited by examiner

HEAT EXCHANGER

RELATED APPLICATIONS

The present application is a continuation of and claims priority to U.S. patent application Ser. No. 12/896,651, filed Oct. 1, 2010, which is a continuation-in-part of and claims priority to U.S. patent application Ser. No. 11/764,491, filed Jun. 18, 2007, now U.S. Pat. No. 8,033,323, which claims priority to German Patent Application No. 10 2006 028 578.6, filed Jun. 22, 2006, and which is additionally a continuation-in-part of and claims priority to U.S. patent application Ser. No. 12/696,986, filed Jan. 29, 2010, the entire contents of all of which are hereby incorporated by reference.

FIELD OF THE INVENTION

The present invention relates to a heat exchanger, such as, for example, an exhaust gas heat exchanger.

SUMMARY

An exhaust gas heat exchanger is known from EP 1 348 924 A2 and from EP 1 544 564 A1. These heat exchangers have essentially fulfilled their intended functions. However, recently, exhaust gas mass flows, and also exhaust gas temperatures of motor vehicle engines and consequently also the thermal stresses experienced by exhaust gas coolers have risen. These changes can cause fractures and similar damage caused by excessively high temperature change stresses and can result in the system failing.

Consideration has also been given to improving exhaust gas heat exchangers in terms of their ability to withstand temperature change stresses. Such a solution is known, for example, from WO 03/036214A1. In this document, slits and a folding bellows have been arranged in the housing, as a result of which, the expansion behavior of the individual parts of the exhaust gas heat exchanger can be reliably improved. WO 03/064953 has, on the other hand, provided an expansion bead in the housing casing. WO 2003/01650 has proposed a sliding seat arrangement. All these solutions appear to be expedient without, however, being able to meet all of the requirements of current applications.

DE 32 42 619 A1 also discloses a heat exchanger having a grid-like securing structure, which performs the function of directing or influencing the flow in the housing. Furthermore, elastic elements are provided on the securing structure which are intended to compensate, and can compensate for the specific tolerances in the housing into which the tube bundle is inserted. For this reason, they are formed from a suitable plastic material which can be deformed in the wide regions and which therefore permits relatively large tolerance ranges. The elastic elements are attached to the securing structure, which is made of metal. The vibration damping properties of the elastic element may be present but they are not sufficiently effective. Furthermore, in particular, in heat exchangers with a considerable length, vibrations which can only be adequately dealt with by means of the known elastic elements which occur at other locations. U.S. Pat. No. 3,804,161 also discloses heat exchangers.

In some embodiments, the present invention provides a heat exchanger which can make a contribution to solving one or more of the problems outlined above. The present invention can also or alternatively reduce vibration levels.

Because a grid-like metallic securing structure is embodied in one piece with elastic hook-shaped protrusions which point toward the inside of the housing and which are deformed in the opposite direction to the insertion direction of the bundle into the housing and whose spring force is directed against the housing in order to reduce the vibration level, and because a device which permits and compensates for changes in length and which has elastic properties is embodied and provided by the present invention, vibrations of the bundle in the housing can be significantly reduced and/or damped. The changes in length or changes in shape are induced by changes in temperature which occur during the operation of the heat exchanger. In principle, the natural frequency of the bundle is raised.

The deformed elastic hook-shaped protrusions can project over the cross-sectional surface of the housing before the bundle is inserted into the housing. When it is inserted, the elastic hook-shaped protrusions can be elastically deformed counter to the spring force in order to fit into the housing and in order then to apply this spring force against the inside of the housing.

Alternative proposals for a solution are provided by individual elastic metallic hook-shaped protrusions or springs which are attached to a metallic securing structure or between two metallic securing structures.

Within the scope of their investigations, the inventors have arrived at the conclusion that, in some applications, it is insufficient to provide such elastic, metallic hook-shaped protrusions or springs or the like. For this reason, they additionally provide a device which compensates for changes in length of the bundle and of the housing which are induced by changes in temperature, and they also embody this device with elastic properties in order to promote the vibration reducing property of the entire device.

In some embodiments, the present invention also provides for the housing to be composed of aluminum and to be embodied as a cast part into which the bundle, which can be a stainless steel soldered structure, can be inserted with tube plates, which are provided on the tube ends, and a diffuser.

The housing can have a connecting flange which can be matched to the diffuser, the device which permits changes in length having an elastic seal between the diffuser and the connecting flange.

In some embodiments, the present invention can include an elastic seal arranged in at least one groove, or alternatively, positioned to fill substantially the entire region between the diffuser and connecting flange.

In some embodiments, the present invention provides at least one clamping element, which extends through the bundle and is arranged between two grid-like securing structures in order to dampen vibrations. In some such embodiments, a device which permits changes in length and which has elastic properties is also provided.

The tubes can be constructed as flat tubes which can be composed of pairs of plates and/or can be manufactured from a sheet metal strip and welded to a longitudinal seam. Round tubes which extend as tube bundles straight through the heat exchanger in a manner similar to that shown in DE 32 42 619 A1 can also or alternatively be used. However, in order to improve the exchange of heat, these tubes can have a twist which provides the tube wall with a corrugation.

Emission concerns associated with the operation of internal combustion engines (e.g., diesel and other types of engines) have resulted in an increased emphasis on the use of exhaust gas heat exchange systems with such engines in vehicular and non-vehicular applications. These systems are often employed as part of an exhaust gas recirculation (EGR) system in which a portion of an engine's exhaust is returned to combustion chambers via an intake system. The result is that some of the oxygen that would ordinarily be inducted into the engine as part of its fresh combustion air charge is displaced with inert gases. The presence of the inert exhaust gas typically serves to lower the combustion temperature, thereby reducing the rate of NOx formation.

In order to achieve the foregoing, it is desirable for the temperature of the recirculated exhaust to be lowered prior to the exhaust being delivered into the intake manifold of the engine. In many applications employing EGR systems, exhaust gas recirculation coolers (EGR coolers) are employed to reduce the temperature of the recirculated exhaust. In the usual case, engine coolant is brought into heat exchange relation with the exhaust gas within the EGR cooler in order to achieve the desired reduction in temperature. The use of engine coolant provides certain advantages in that appropriate structure for subsequently rejecting heat from the engine coolant to the ambient air is already available for use in applications requiring an EGR system.

In some applications, however, the temperature to which recirculated exhaust must be lowered in order to achieve the desired reduction in the rate of NOx formation is lower than, or appreciably close to, the temperature at which the engine coolant is regulated by the engine's thermal management system. In such cases, a second EGR cooler may be employed to extract from the recirculated exhaust that portion of the desired heat load which cannot be readily transferred to the engine coolant at its regulated temperature. This second EGR cooler (frequently referred to as a "low temperature EGR cooler" or "LT EGR cooler") commonly receives either a flow of coolant from a separately regulated coolant loop, or a portion of the regular engine coolant loop which has been cooled to a lower temperature.

Packaging the LT EGR cooler along with an EGR cooler (sometimes referred to as the "high temperature EGR cooler" or "HT EGR cooler") can be problematic due to space constraints. Placing both EGR coolers into a common casing can help to ease these packaging issues, but can make it more difficult to accommodate the differences in thermal expansion between the exhaust gas conveying tubes in the EGR coolers and the casing. Such thermal expansion differences have been known to lead to premature failure of the heat exchanger.

Although applications involving EGR cooler connections (to other EGR coolers and/or other structures) illustrate the design challenges described above, such challenges exist in other heat exchanger applications as well—some of which involve heat exchangers outside of exhaust gas recirculation technology. Based upon these and other limitations of conventional heat exchanger connection designs, improved heat exchanger connections and connection methods continue to be welcome in the art.

In accordance with some embodiments, of the present invention, a heat exchanger includes a casing having a proximal end and a distal end, with a fluid flow path extending from the proximal end to the distal end. The heat exchanger further includes a plurality of heat exchange tubes defining a first section of the fluid flow path extending from the proximal end, and another plurality of heat exchange tubes defining a second section of the fluid flow path extending to the distal end. A third section of the fluid flow path fluidly connects the first section to the second section, and includes at least one sealing plate. The heat exchange tubes defining the first section are rigidly attached to the casing at the proximal end, and are structurally decoupled from the casing at their opposite ends. The heat exchange tubes defining the second section are rigidly attached to the casing at the distal end, and are structurally decoupled from both the casing and the heat exchange tubes defining the first section at their opposite ends.

Another feature of the present invention includes a casing having a pocket containing at least a portion of the sealing plate. The pocket is defined by a planar wall that provides a sealing surface for a fluid-tight seal between the casing and the sealing plate, and by one or more peripheral walls that bound the outer periphery of the planar wall. The pocket may be further defined by another planar wall that is parallel to and spaced apart from the first planar wall. This second planar wall can provide a sealing surface for a fluid-tight seal between the casing and a second sealing plate.

In some embodiments, the third section of the fluid flow path includes a group of one or more cylindrical flow conduits rigidly attached to the heat exchange tubes defining the first section, and a group of one or more cylindrical flow conduits rigidly attached to the heat exchange tubes of defining the second section. At least one of the groups extends at least partially into the pocket in the casing. As one feature, fluid-tight seals extend around one or more of the cylindrical flow conduits and allow for movement in the axial direction relative to the casing. The first and second groups of cylindrical flow conduits may be separated from one another in order to accommodate thermal expansion differences between the heat exchange tubes and the casing.

In some embodiments of the present invention, the heat exchanger includes a second fluid flow path passing over the heat exchange tubes defining the first section, and a third fluid flow path passing over the heat exchange tubes defining the second section. The second and third fluid flow paths are sealed off from the first fluid flow path by at least some of the fluid-tight seals in the third section of the first fluid flow path. In some cases the second and third fluid flow paths are not in fluid communication with one another within the heat exchanger.

In some embodiments of the invention the heat exchanger may be used as an EGR cooler, with a recirculated exhaust gas flowing along the first flow path, a first flow of coolant flowing along the second flow path, and a second flow of coolant flowing along the third flow path. In some cases one of the flows of coolant may be at a lower temperature than the other flow of coolant.

In accordance with some embodiments of the present invention, a heat exchanger includes a casing having a proximal end and a distal end, with a fluid flow path extending from the proximal end to the distal end. The heat exchanger further includes a first plurality of heat exchange tubes defining a portion of the fluid flow path including the proximal end, and a second plurality of heat exchange tubes defining a portion of the fluid flow path including the distal end. A flow transitioning structure defines the fluid flow path between the distal end of the first plurality of heat exchange tubes and the proximal end of the second plurality of heat exchange tubes, and structurally decouples the distal end of the first plurality of heat exchange tubes from the proximal end of the second plurality of heat exchange tubes.

In some embodiments, the casing includes a pocket containing at least a portion of the flow transitioning structure. The pocket is defined by a planar wall that provides a sealing surface for a fluid-tight seal between the casing and the flow transitioning structure, and by one or more peripheral walls that bound the outer periphery of the planar wall. The pocket may be further defined by another planar wall that is parallel to and spaced apart from the first planar wall. This second planar wall can provide another sealing surface for another fluid-tight seal between the casing and the flow transitioning structure.

Other independent aspects of the invention will become apparent by consideration of the detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
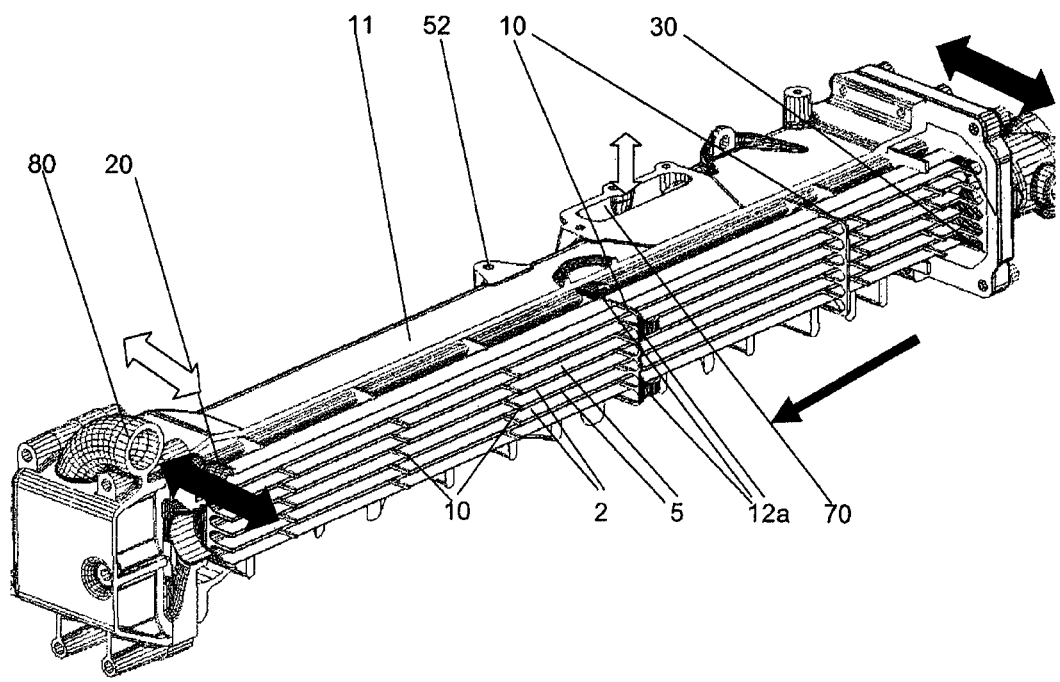
FIG. 1 shows a perspective view of a cut open exhaust gas heat exchanger.

The block arrows in FIG. 1 indicate the direction of flow through the exhaust gas heat exchanger, with the black block arrows being intended to symbolize the exhaust gas and the block arrows without filling symbolizing the cooling fluid flow. The illustration as doubled block arrows is intended to indicate that the media can flow through the exhaust gas heat exchanger in either a parallel flow manner or in a counter flow manner. Corresponding inlets and outlets 80, 70 are provided. The corresponding arrows in FIGS. 1 and 2 which point in the longitudinal direction of the heat exchanger show the insertion direction of the tube bundle into the housing 11.

The tube bundle of the heat exchanger includes a plurality of tubes 2 which are formed as drawn flat tubes 2 in the exemplary embodiment. In the illustrated embodiment, each flat tube 2 contains a turbulator 3. In each case a coolant duct 5, which can be equipped with flow directing elements, can be arranged between two flat tubes 2. No such elements are shown in the figures, but the coolant ducts 5 are of rather flat design. In the exemplary embodiments, two rows 2.1 and 2.2 of flat tubes 2 have been provided. As is apparent from FIG. 4, there are six flat tubes 2 in each row.

The tube bundle in FIG. 1 has a plurality (i.e., five) of grid-like metallic securing devices 10, with just one of them (in the exemplary embodiment) having been equipped integrally therewith with sprung hook-shaped protrusions 12 which are arranged on opposite sides of the securing device 10 or of the tube bundle. Depending on the length of the heat exchanger and/or according to other influencing factors, a corresponding selection of securing devices 10 can be embodied integrally with sprung hook-shaped protrusions 12. Instead of one-piece hook-shaped protrusions 12 it is also possible to provide springs 12b or the like as individual parts which are to be attached to the securing devices 10 in a frictionally and/or positively locking fashion.

Figure 2:
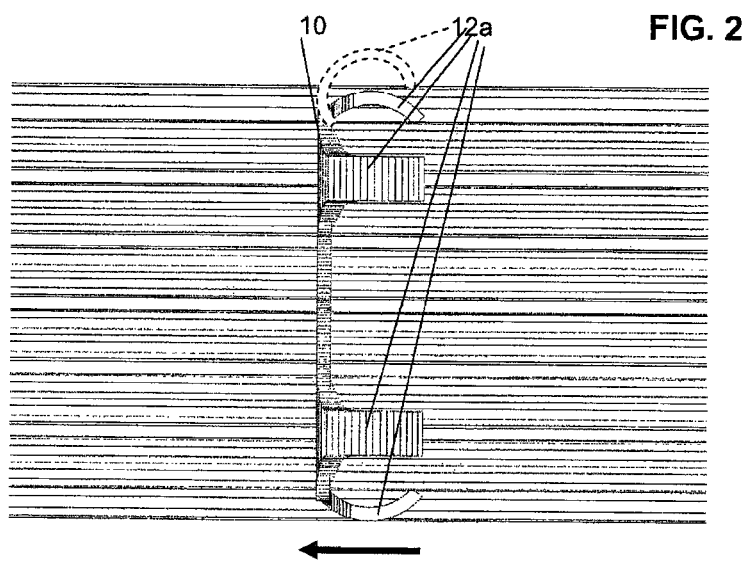
FIG. 2 is a detailed view showing a piece of the tube bundle with a securing device.
Figure 3:
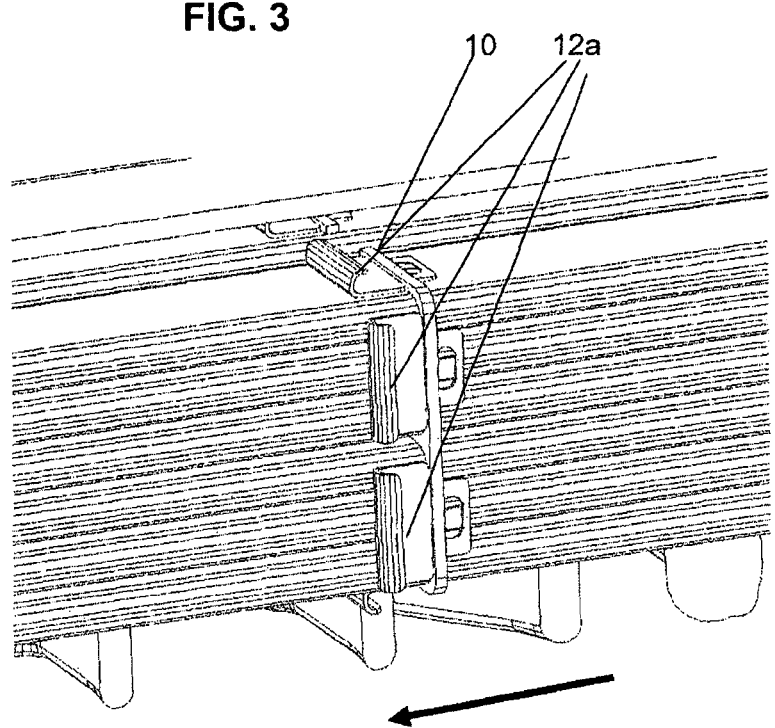
FIGS. 3-4 are similar to FIG. 2 but with modified securing devices.
Figure 4:
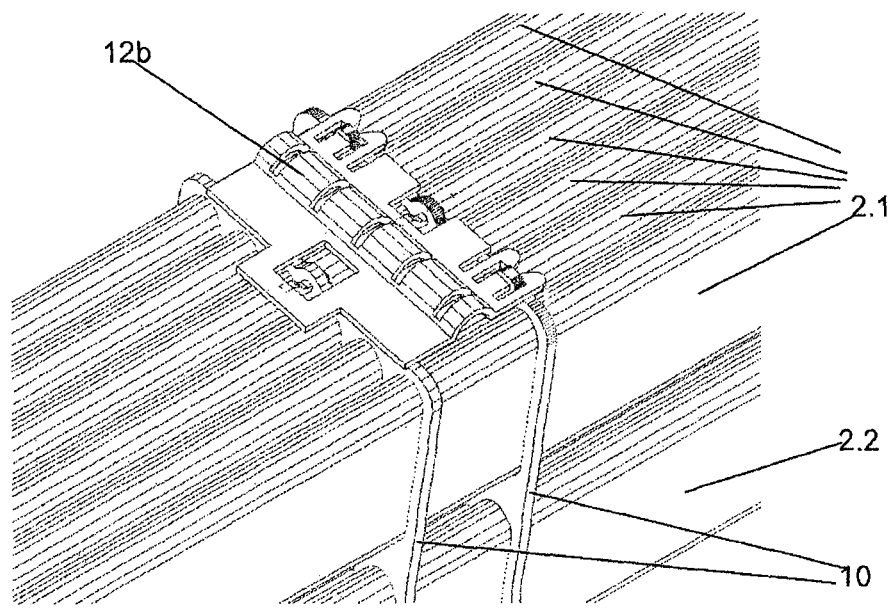

Two exemplary embodiments which show sprung, metallic hook-shaped protrusions 12 as individual parts, which are attached in a frictionally and positively locking fashion to grid-like, metallic securing devices 10, have been represented in FIGS. 3 and 4. From the figures, in particular from FIG. 2, it is also clear that the sprung, metallic hook-shaped protrusions 12 are deformed in the opposite direction to the insertion direction in order to facilitate the insertion.

In FIG. 2, the position of the hook-shaped protrusions 12 before insertion into the housing 11 which is not shown there was indicated in a basic fashion using the example of a single hook-shaped protrusion 12 by dashed lines. The hook-shaped protrusions 12 are arranged on opposite sides. The hook-shaped protrusions 12 therefore protrude somewhat further from the virtual center of the heat exchanger and are forced, as the tube bundle is inserted into the housing 11, during which process they move in a sprung fashion toward the center and undergo a change in shape which occurs within the elastic region. The spring force of the hook-shaped protrusions 12, which is built up in the process, then acts against the housing wall and ensures, through interaction with the hook-shaped protrusions 12, which are arranged on opposite sides, that there is a corresponding reduction in the vibrations which occur during operation of the heat exchanger, for example in a motor vehicle.

Irrespective of whether hook-shaped protrusions 12 are provided or not, the grid-like securing devices 10 can, for example, be in two parts, with the parts being pushed in a comb-like fashion from opposite sides over the flat tubes 2 or being pushed in one part and then from one end of the tube bundle in its longitudinal direction as far as the position provided. The grid rods are intended at any rate to extend through the coolant duct 5.

A tube plate 30 and a collecting box for a diffuser 31 are fitted on both ends of the tube bundle. The diffuser 31 changes the geometry on the exhaust gas side from a four corner shape at the tube plate 30 into a round shape at the connecting flange 60 (see below). One or more of the aforementioned components can be manufactured from stainless steel. The described structure can be connected to form one physical unit in a hard soldering process. However, when springs or the like are provided as individual parts they can also be attached to the securing device 10 after the soldering.

The soldered physical unit can then be inserted into a housing 11 (with the diffuser 31 at the front) in the insertion direction indicated by the aforementioned arrow, and can be completely mounted.

The housing 11 can be a cast structure made of aluminum. It can have a connecting flange 60 for the exhaust gas which is dimensioned in such a way that the diffuser 31 which is soldered onto the tube bundle by means of a tube plate 30 fits and is received therein. In addition, a groove 61 can be formed in which an elastic sealing ring or some other suitable seal 62 can be located (see FIGS. 7-8).

Figure 7:
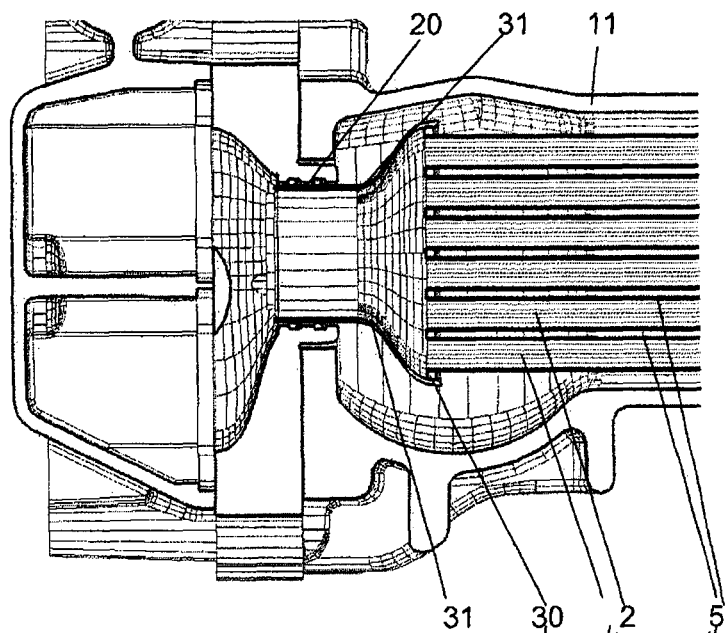
FIGS. 7-9 show details of the heat exchanger in the region of the elastic device.
Figure 8:
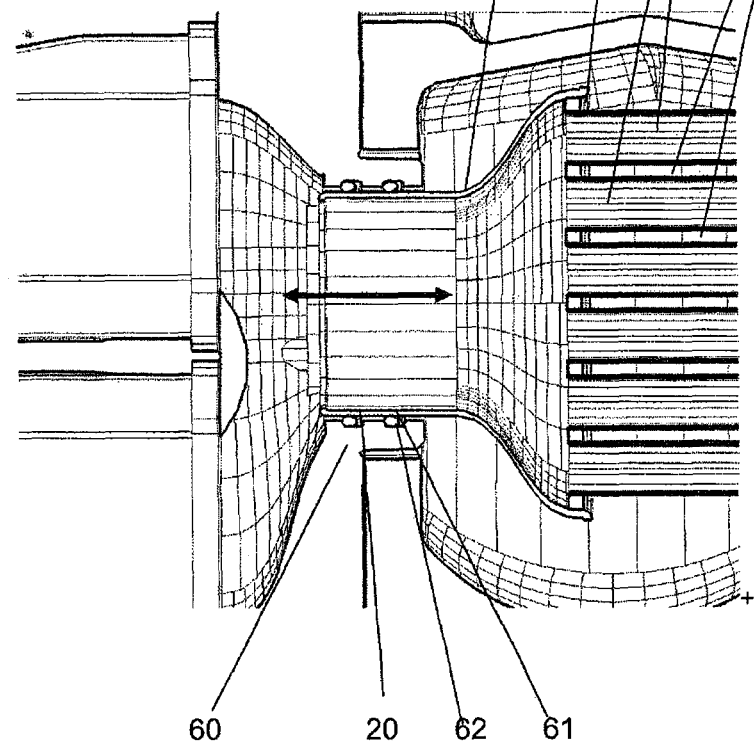
Figure 9:
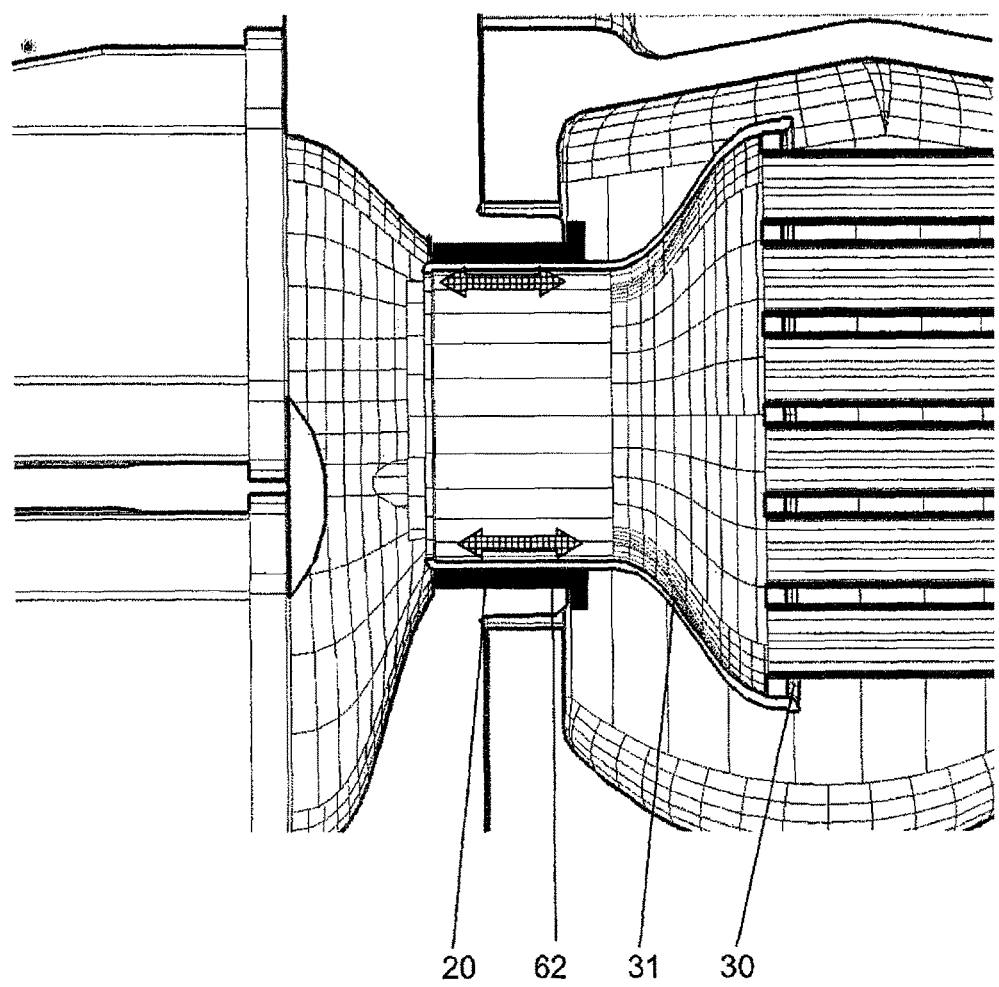

FIG. 8 shows an enlarged detail from FIG. 7. From this illustration it is clear that changes in length caused by changes in temperature can be compensated for by permitting movements in the longitudinal direction of the tube bundle or of the housing 11. The two doubled block arrows in FIG. 9 are intended to indicate this. In FIG. 9, in order to form the elastic properties of the device 20, the entire annular gap region between the diffuser 31 and the connecting flange 60 has been provided with an elastic rubber ring 62 or the like—instead of the two O-rings 62 in the groove 61 according to FIGS. 7 and 8. Here, improved elastic properties can be expected. The existing annular gap can be somewhat larger here, viewed in the radial direction, than in the exemplary embodiment according to FIGS. 7-8.

The formation of sliding seats which are present in the prior art and in which metal is usually slid on metal is avoided by means of this proposal, with the aim of improving the vibration behavior of the heat exchanger. As is shown further by FIG. 8, a ring shaped gap which is still visible there but is actually smaller still remains there between the end of the diffuser 31 and the flange 60 in order to make use of the elastic properties of the O-rings 62 for vibration damping.

A further flange 50, to which the tube plate 30 of the tube bundle and a further exhaust gas collecting box 51 have been attached, has been formed at the other end of the housing 11. In addition, connectors 52 are formed on the housing 11 in order to be able to attach the exhaust gas heat exchanger to a connecting structure (not shown). Finally, connectors 70 have also been provided on the housing 11 in order to allow the coolant to flow in and out of the coolant ducts 5 of the tube bundle.

Figure 5:
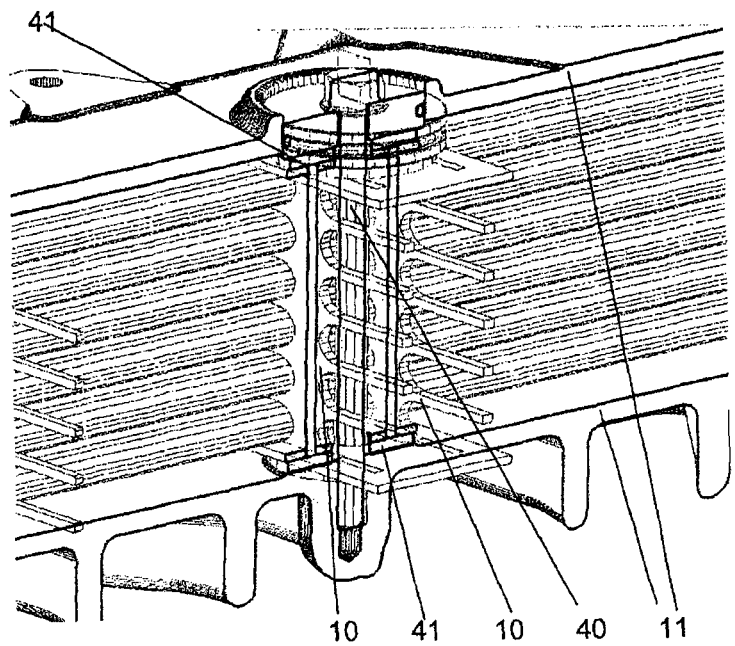
FIGS. 5-6 are detailed views of the heat exchanger with a clamping device.
Figure 6:
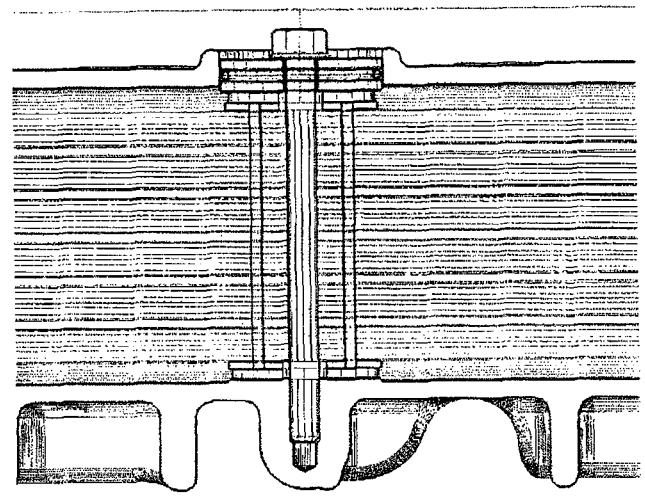

FIGS. 5-6 show that similar effects can also be achieved by the use of one (or more) clamping elements 40 which can replace the sprung metallic hook-shaped protrusions 12 or the springs or the like, but could also supplement them. The clamping element 40 can be a bolt which extends through the bundle between the tubes 2 and connects housing walls lying opposite. Rubber rings 41 or the like can be inserted in order to damp the vibrations.

Figure 10:
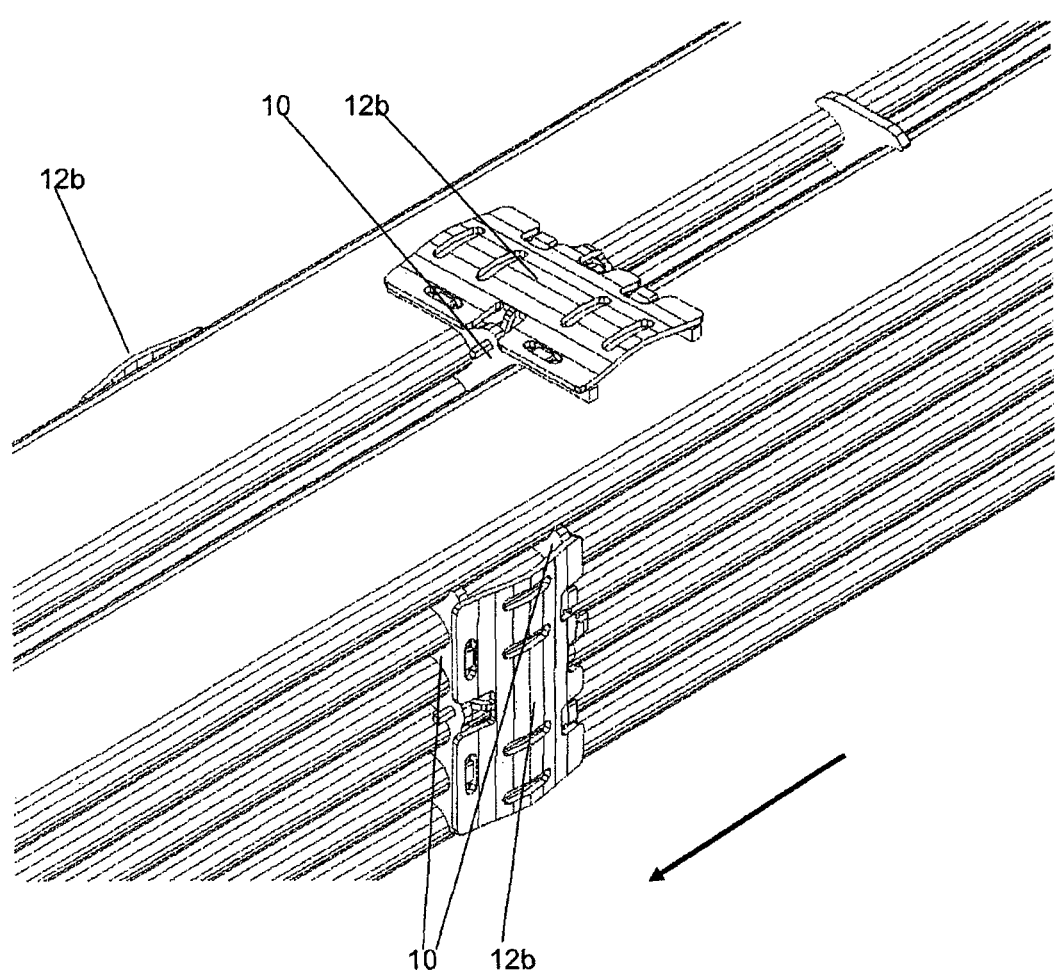
FIG. 10 is similar to FIG. 4 but with modified spring devices.

FIG. 10 shows curved springs 12b or similar elements which are attached between two grid-like, metallic securing structures 10. The curvature is also embodied here in such a way that the insertion process can be carried out, during which process the springs 12b yield elastically. As is shown by FIG. 10, the springs 12b which are arranged on opposite sides can also be arranged in an offset fashion, i.e. all four springs do not need to lie in one plane which passes through the tube bundle.

It has become apparent that the present invention can allow the vibrations of the tube bundle in the housing to be overcome in such a way that fractures and/or noise caused by them are avoided and/or substantially reduced.

An embodiment of a heat exchanger 101 according to the present invention is shown in FIGS. 11-18a. The heat exchanger 101 provides a flow path 108 for a fluid to pass through the heat exchanger 101, wherein the flow path 108 extends from a proximal end 111 of the heat exchanger 101 to a distal end 112 of the heat exchanger 101. The flow path 108 is enclosed within a casing 102, which can comprise multiple casing sections 103. As further shown in FIG. 11, the casing 102 of the illustrated embodiment additionally encloses flow paths 109 and 110, along which one or more fluids can be passed through the heat exchanger 101 so as to be placed in heat exchange relation with a fluid passing along the flow path 108.

Figure 11:
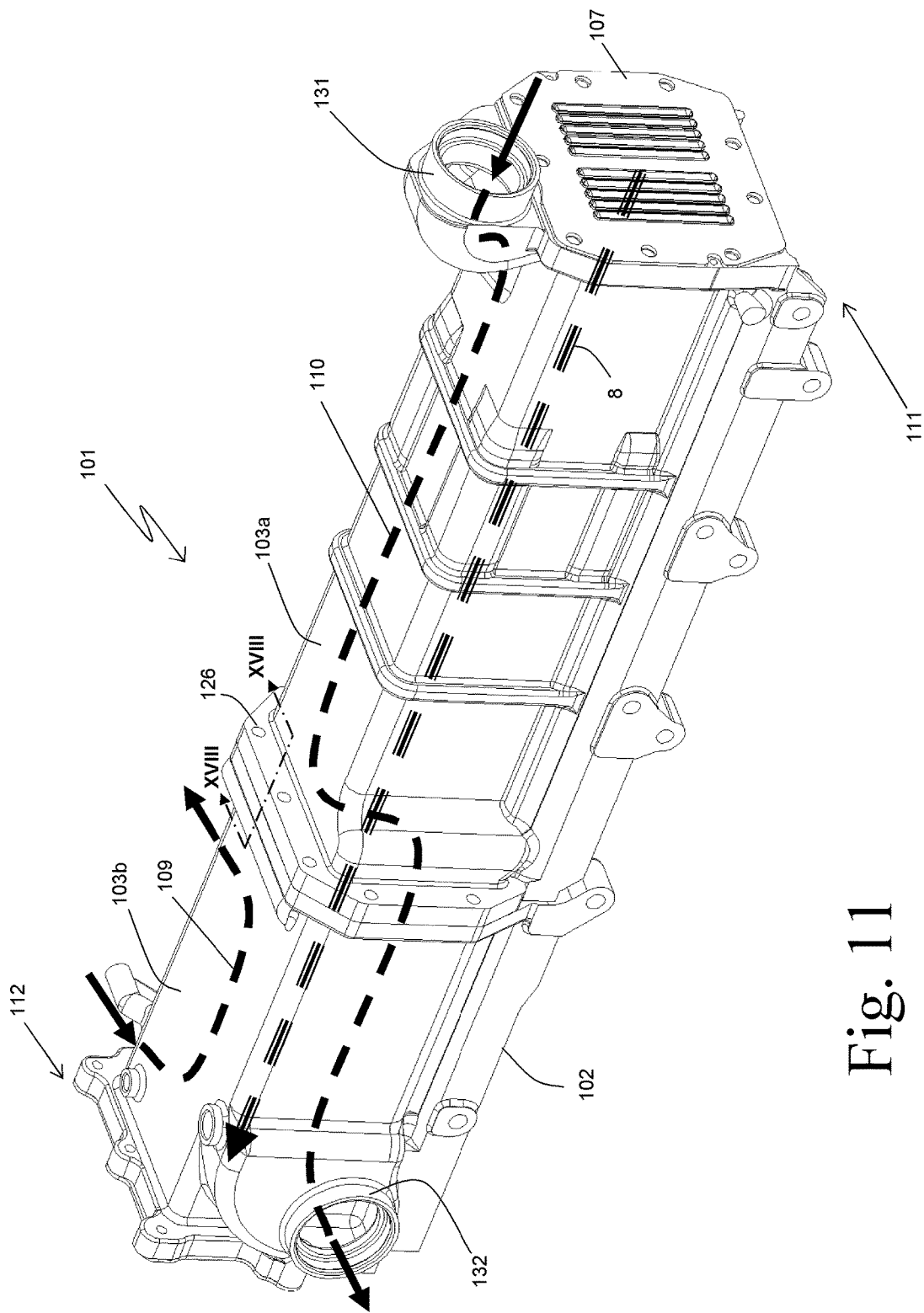
FIG. 11 is a perspective view of a heat exchanger according to an embodiment of the present invention.

Although FIG. 11 shows the flow paths 108 and 109 to be in counter-current flow orientation, it should be understood that in some applications, other flow orientations (such as, for example, concurrent flow), may be preferred or equally suitable. Similarly, although flow paths 108 and 110 are depicted as being in concurrent flow orientation, it should be understood that in some applications, other flow orientations, such as, for example, counter-current flow, may be preferred or equally suitable.

Figure 12:
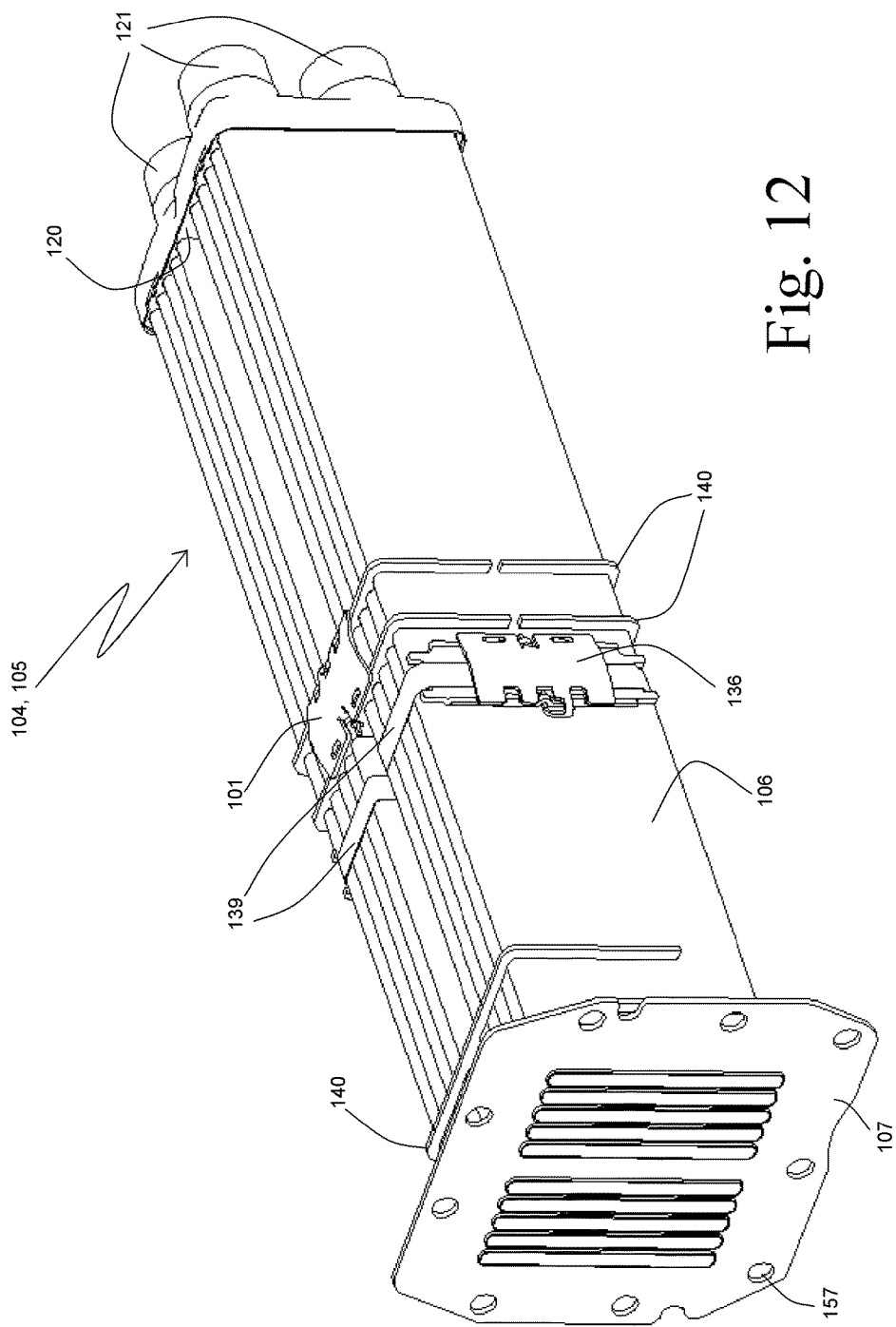
FIG. 12 is a perspective view of a heat exchanger core for use in the heat exchanger of FIG. 11.

The fluid flow paths 108, 109 and 110 of the illustrated embodiment are at least partially defined by first and second heat exchange cores 104 and 105, shown generically in FIG. 12. Each heat exchange core 104, 105 of the heat exchanger 101 shown in FIG. 11 has a construction as shown in FIG. 12 (although adapted in length as needed to match the casings 103a, 103b into which the cores 104, 105 are received, as necessary). Each of the cores 104, 105 include a bundle of parallel heat exchange tubes 106 extending between a first header 107 and a second header 120. Ends of the tubes 106 are sealingly attached to the headers 107, 120, such as by brazing, welding, or in any other suitable manner. Cylindrical flow conduits 121 are provided at that end of the core 105 where the tubes 106 are attached to the header 120, to at least partially define another portion of the fluid flow path 108 downstream or upstream of the portion defined by the heat exchange tubes 106. It should be understood that, although the exemplary embodiment depicts four of the cylindrical flow conduits 121, the number of flow conduits present in a given application may be less than or more than four, without limitation.

The heat exchange cores 104, 105 further may include one or more baffles 140 arranged along the length of either or both heat exchange cores 104, 105. Such baffles 140 can provide benefit during assembly of the heat exchange cores 104, 105 by maintaining desired spacing between the tubes 106. In some embodiments, the baffles 140 can define a tortuous portion of the flow path 109 or 110 over the outer surfaces of the heat exchange tubes 106 in order to increase the rate of heat transfer between fluids traveling over and through the tubes. Alternatively or in addition, fluid flow plates (not shown) can be included between adjacent heat exchange tubes 106 in order to direct a fluid flowing along the flow path 109 or 110.

In some embodiments, the heat exchange cores 104, 105 can include spring plates 136 around one or more of the outer surfaces of the bundles of tubes 106. The utility of these spring plates 136 will be discussed in detail below. In some cases, one or more of the spring plates 136 can be attached directly to one or more of the baffles 140. Alternatively or in addition, one or more of the spring plates 136 can be attached to straps 139 (see FIGS. 12, 16 and 20) at least partially wrapped around one or more of the heat exchange tubes 106, and/or other structure located adjacent, between, or around the heat exchange tubes 106. In the illustrated construction, attachment structure similar to that provided by the baffles 140 is connected to the strap 139 to attach the spring plate(s) 136 to the strap 139.

Figure 13:
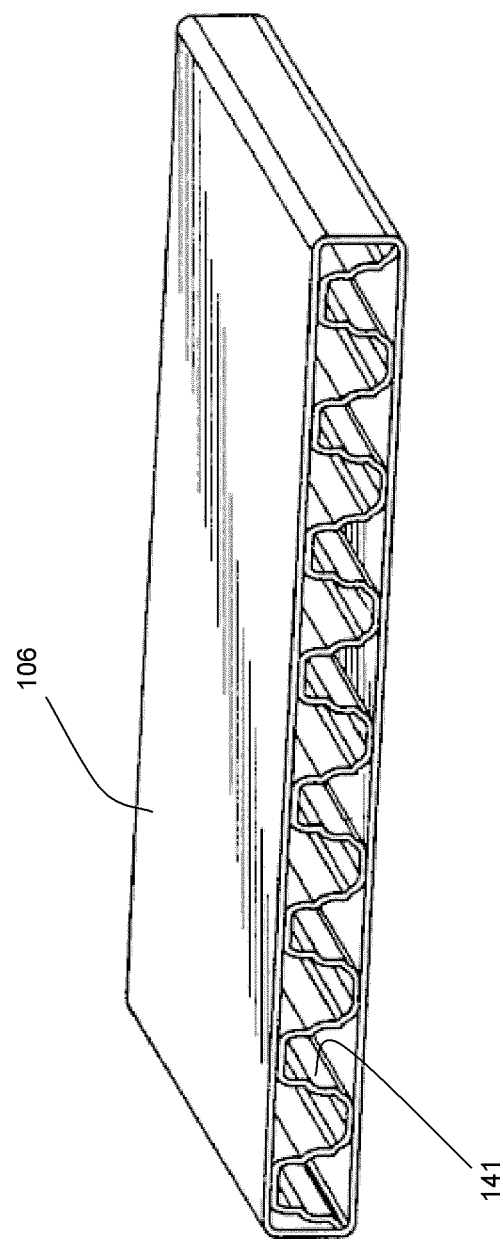
FIG. 13 is a perspective view of a tube and insert for use in the heat exchange core of FIG. 12.

It should be readily apparent to those having skill in the art that the heat exchange tubes 106 can take many different forms. In some embodiments, such as that shown in FIG. 12, the tubes 106 can be flat tubes having first and second opposing substantially flat and long walls connected with relatively short (and in some cases, arcuately shaped) walls. In other embodiments, the tubes 106 can have a more rectangular shape, as shown in FIG. 13. In still other embodiments, the tubes 106 can have a circular cross-sectional shape, or can be constructed from two or more stacked plates. Also, in some embodiments, one or more of the heat exchange tubes 106 include an insert 141 (shown in FIG. 13) floating within or bonded to the inner walls of the tubes 106 to improve the rate of heat transfer to or from fluid traveling through the tubes 106.

While the cores 104, 105 for a given heat exchanger 101 may be identical to one another in some cases, it should be understood that there is no requirement for them to be identical. In some cases, the cores 104, 105 can differ in a variety of ways, including but not limited to tube length, tube size, number of tubes, arrangement of tubes 106, and the like.

Figure 14:
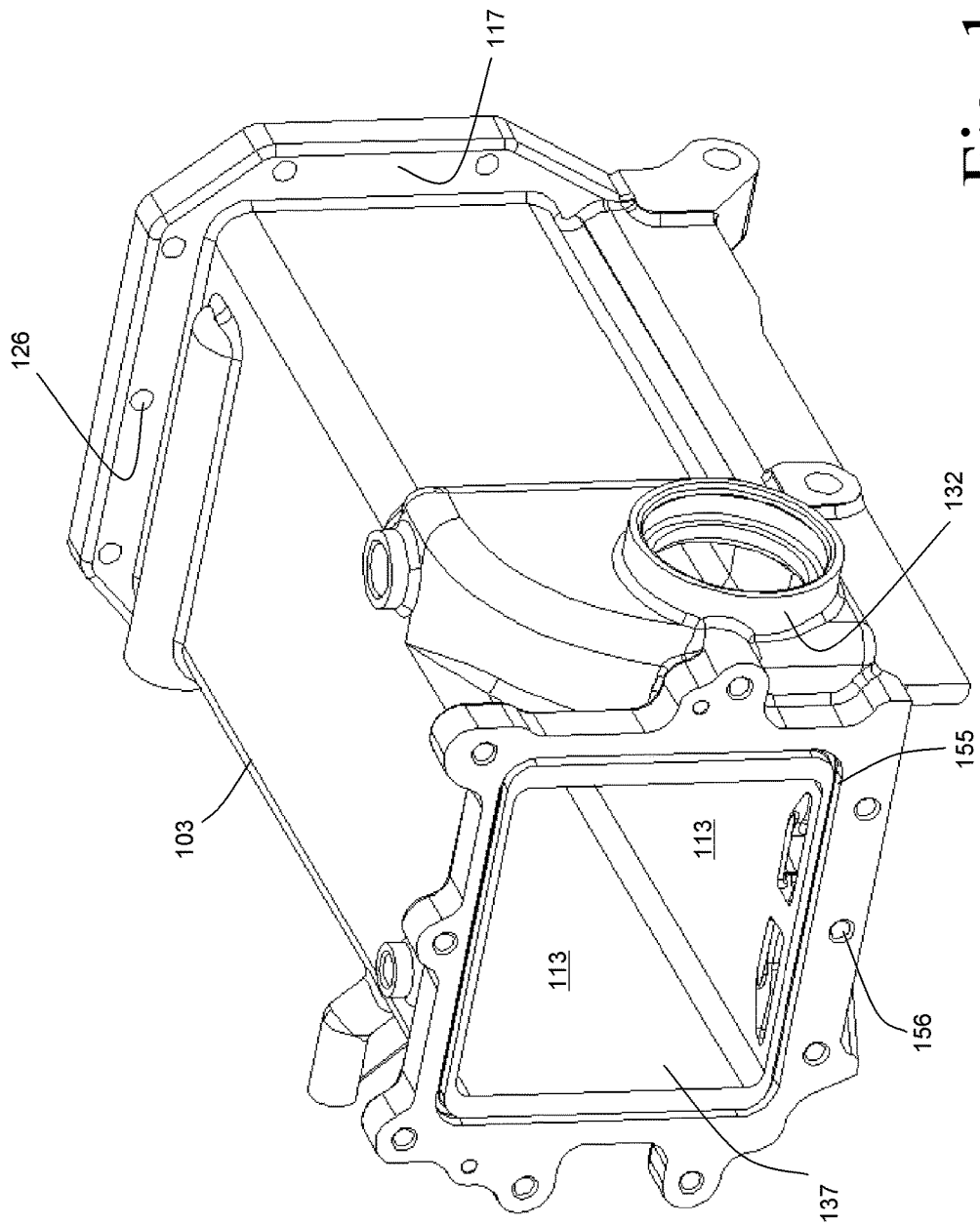
FIG. 14 is a perspective view of a casing section of the heat exchanger of FIG. 11.
Figure 15:
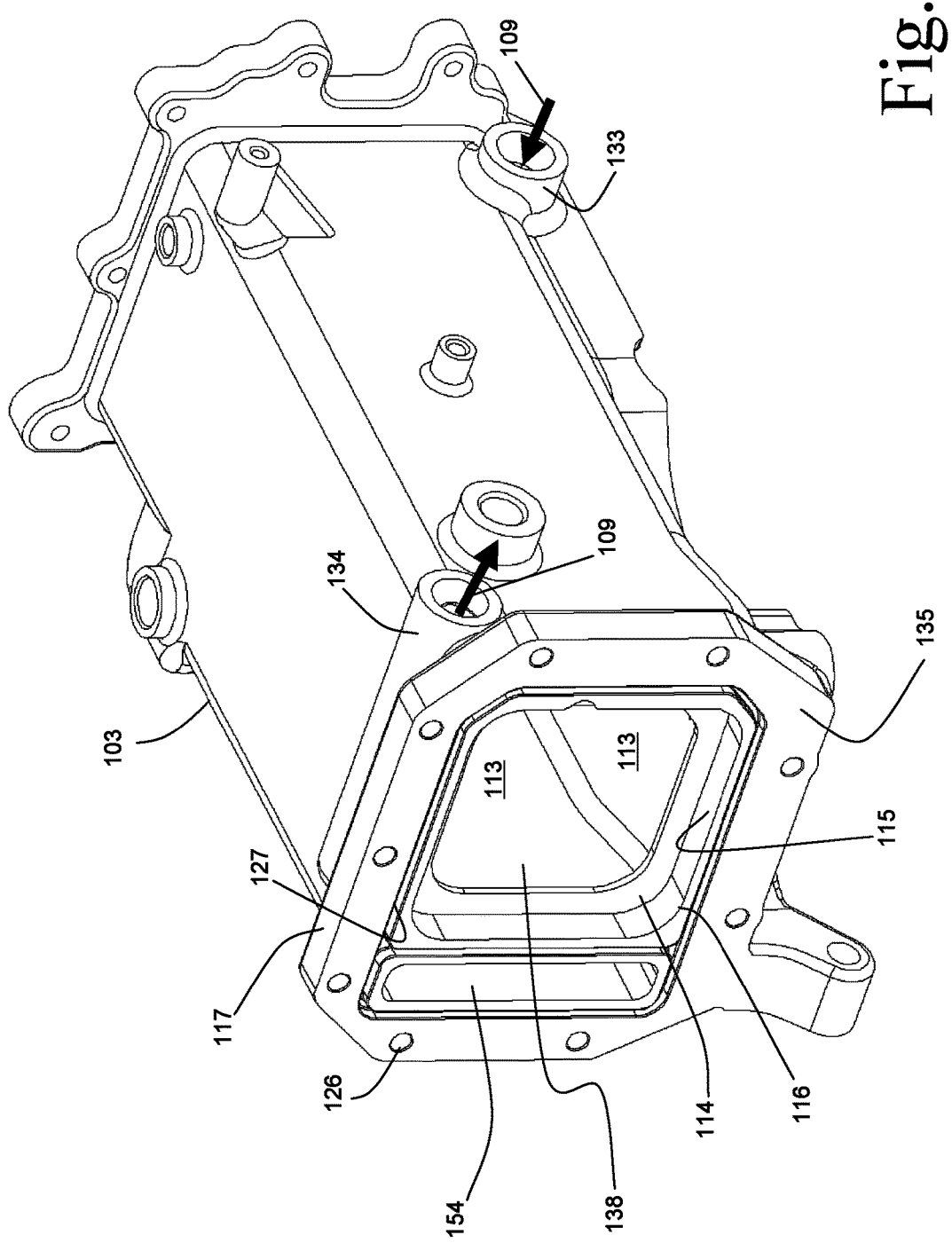
FIG. 15 is another perspective view of the casing section of FIG. 14.

Turning now to FIGS. 14-15, certain aspects of a casing section 103 will be discussed. Although the specific casing section 103 shown in FIGS. 14-15 corresponds to the casing section 103b in FIG. 11, it should be understood that certain features shown in FIGS. 14-15 can similarly be found in the casing section 103a of FIG. 11.

The casing section 103 of FIGS. 14-15 includes a first opening 137 at a first end of the casing section 103, and a second opening 138 at a second end opposite the first end. The opening 137 can be sized to accommodate the entirety of a core 104 or 105 (in some cases, without the header plate 107). The opening 138 can be smaller than the opening 137, and can be sized to at least accommodate the one or more cylindrical flow conduits 121 of a core 104 or 105.

The illustrated casing section 103 further includes a plurality of fastening locations 126 at the second end. These fastening locations 126 can be located in a flange 117 at the second end. While the specific fastening locations 126 shown in the accompanying figures are depicted as circular through-holes, it should be understood that any other assembly features suitable for assembling casing sections can be similarly substituted. For example, the fastening locations 126 can, in some cases, take the form of pins, V-band grooves, blind threaded holes, etc.

The casing section 103 can include a pocket 116 at the second end. In some embodiments, the pocket 116 is defined by a planar wall 114 in which the opening 138 is located, and by one or more walls 115 bounding the outer periphery of the planar wall 114. In other embodiments, the pocket 116 can be defined by other portions of the casing while still providing a recess open to and facing away from the rest of the casing section 103, and can be wider, thinner, deeper, or shallower as desired. Additionally, the casing section 103 may optionally include a groove 127 at the second end, with the opening 138 at least partially enclosed by the groove 127. In those embodiments in which both a pocket 116 and a groove 127 are present, the groove 127 can encircle the pocket 116, as shown in FIG. 15.

In some embodiments, the casing section 103 includes one or more of the following: an inlet 133 to receive a fluid traveling along the flow path 109 into the heat exchanger 101; an outlet 134 to remove a fluid traveling along the flow path 9 from the heat exchanger 101; an inlet 131 to receive a fluid traveling along the flow path 110 from the heat exchanger 101; and an outlet 132 to remove a fluid traveling along the flow path 110 from the heat exchanger 101. A casing section 103 can also include a flow conduit 154 to allow a fluid traveling along one of the flow paths 109, 110 to transfer from the casing section 103 to another casing section 103 without exiting the heat exchanger 101. Such a flow conduit 154 can, if present, be advantageously disposed within the boundaries of the groove 127, if present.

Figure 16:
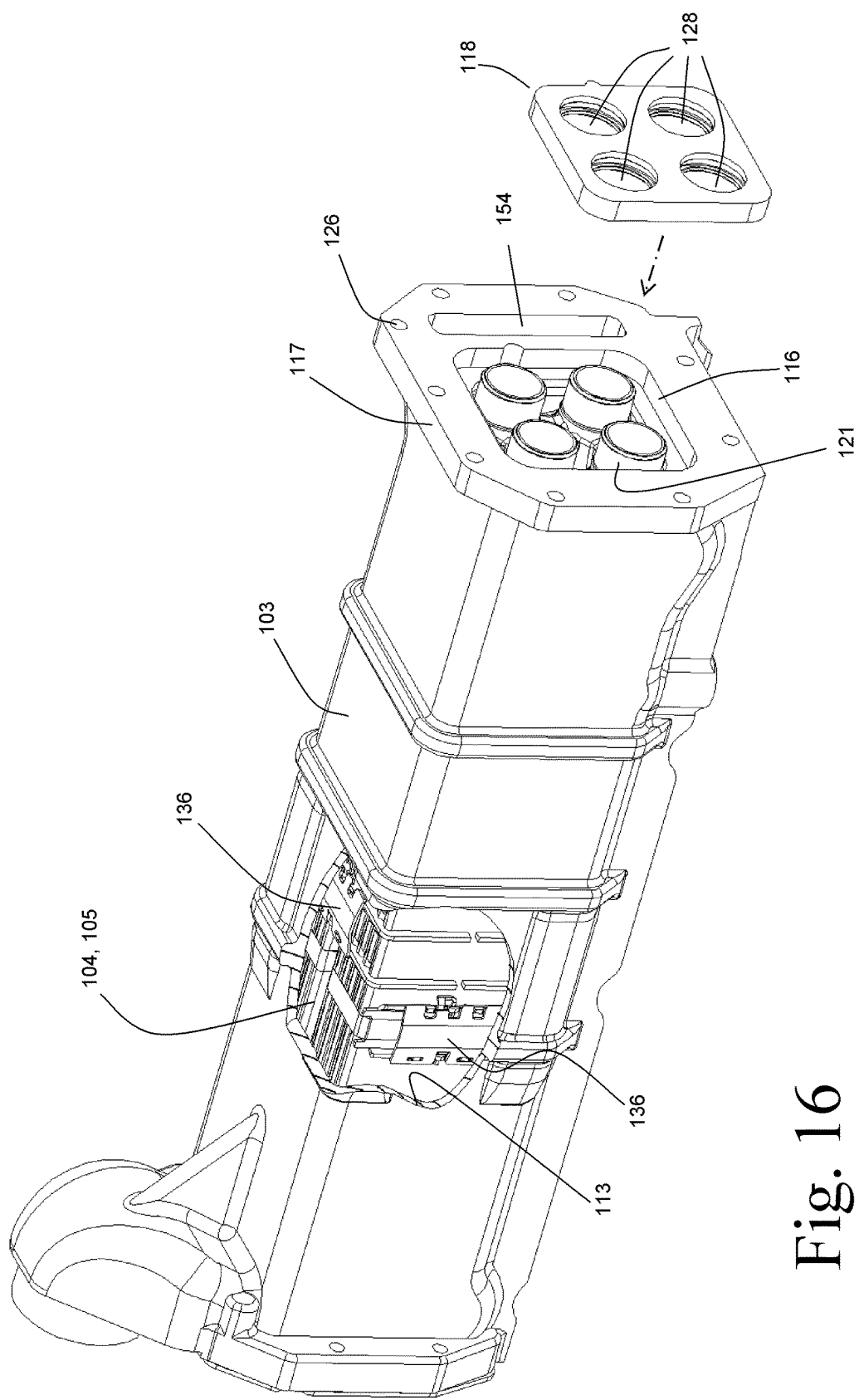
FIG. 16 is a partially exploded and partially cut-away perspective view of a portion of the heat exchanger of FIG. 11.
Figure 17:
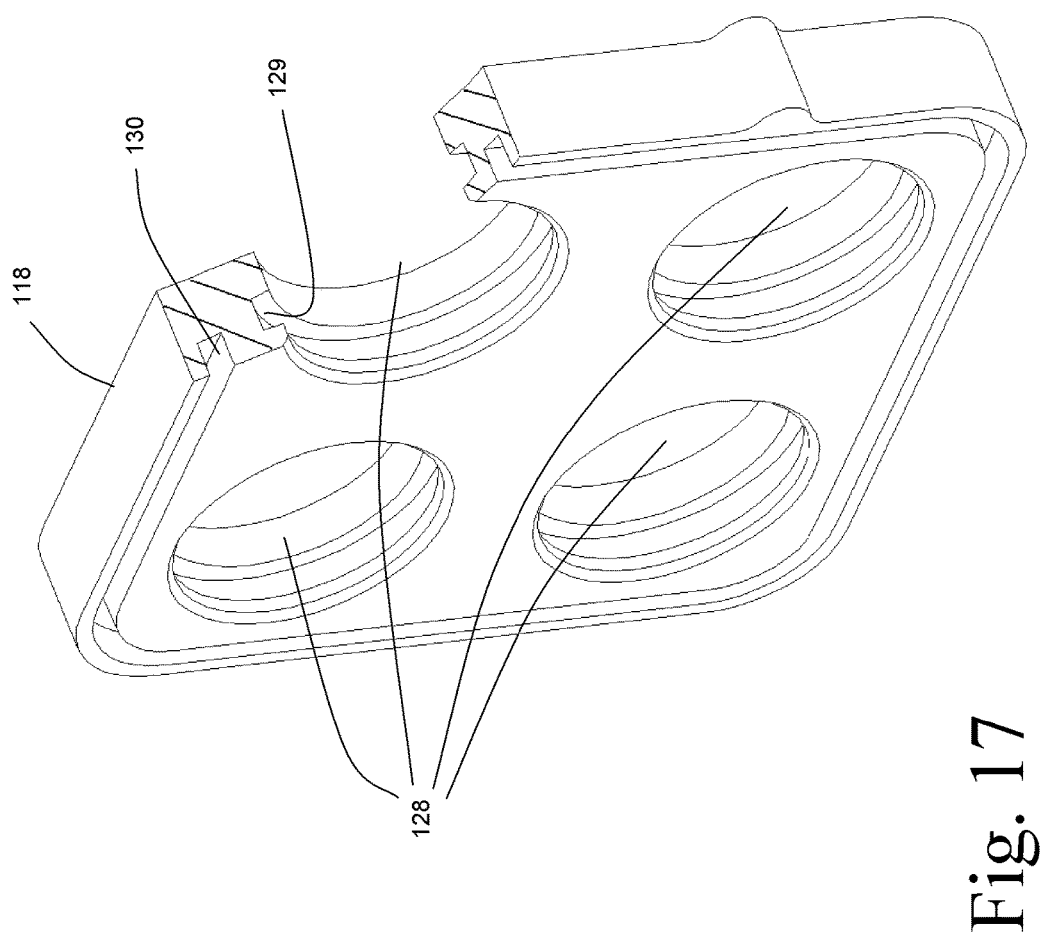
FIG. 17 is a cut-away perspective view of a sealing plate for use in the heat exchanger of FIG. 11.

Heat exchange cores 104, 105 can each be assembled into respective ones of the casing sections 103a and 103b, as shown in FIG. 16. A core 104 or 105 can be inserted into a casing section 103 by passing the core 104, 105 through the opening 137 of the respective casing section 103a, 103b, starting with the cylindrical conduits 121, until the header 107 of the core 104, 105 reaches the casing section 103a, 103b, respectively. Spring plates 136 assembled to outer surfaces of the core 104, 105 can be used to locate the core 104, 105 within the casing section 103a, 103b by engaging with, and sliding along, one or more inner surfaces 113 of the casing section 103a, 103b. The spring plates 136 can have a suitable compliancy such that they can deform to allow for contact between all of the spring plates 136 and their corresponding adjacent walls 113. This allows the core 104, 105 to be firmly contained within the respective casing section 103a, 103b in order to withstand shock and/or vibration loadings that may be experienced during operation of the heat exchanger 101, even when the inner surfaces 113 of the casing sections 103a, 103b are uneven, and/or have varying surfaces resulting from production variations and manufacturing tolerances (e.g., in casting processes).

Once the heat exchange core 104, 105 is so assembled into the respective casing section 103a, 103b, the header 107 of the core 104, 105 can be fastened to the end of the casing 103 in a leak-tight fashion. In some embodiments, this fastening is achieved through the use of mechanical fasteners, such as, for example, bolts that extend through holes 157 found in the header 107 and into corresponding threaded holes 156 in the end of the casing 103a, 103b. A gasket (not shown) can be placed into a groove 155 or can be otherwise installed at another suitable feature at the mating face of the casing 103a, 103b either during or prior to assembly in order to effect a leak-free joint between the header 107 and the casing 103a, 103b. In other cases, a leak-free joint can instead be achieved by welding the header 107 to the casing 103a, 103b along the entire periphery of these elements.

It should be appreciated that assembling the core 104, 105 into the casing section 103a, 103b as described allows for the location of cylindrical flow conduit(s) 121 of the core 104, 105 to vary within the casing section 103a, 103b, since that location will be dictated by the bearing of the spring plates 136 on the inner casing walls 113.

A sealing plate 118 (shown in greater detail in FIG. 17) is assembled onto the end of the heat exchange core 104, 105 by insertion of the cylindrical flow conduits 121 through corresponding apertures 128 in the sealing plate 118. A sealing gasket 122 (shown in FIGS. 8a-8b), such as an O-ring, can be placed into a groove 129 located within each of the apertures 128 in order to achieve a fluid-tight seal between the cylindrical flow conduits 121 and the sealing plate 118. In embodiments in which a plurality of cylindrical flow conduits 121 are used, excellent registration between the sealing plate 118 and the cylindrical flow conduits 121 can be achieved, owing to the unitary construction of both the sealing plate 118 and the end portion of the core 104, 105 containing the cylindrical flow conduits 121, despite the variable location of the core 104, 105 within the casing 103a, 103b.

When the casing section 103a, 103b includes a pocket 116 as described above, the sealing plate 118 can advantageously be received into the pocket 116 such that assembly of the sealing plate 118 does not increase the overall length of the heat exchanger 101. The pocket 116 can be larger than the sealing plate 118 so that a sufficient clearance gap is provided between the peripheral walls 115 of the pocket and the sealing plate in order to allow for variability in the location of the cylindrical flow conduits 121 within the pocket 116.

Figure 18A:
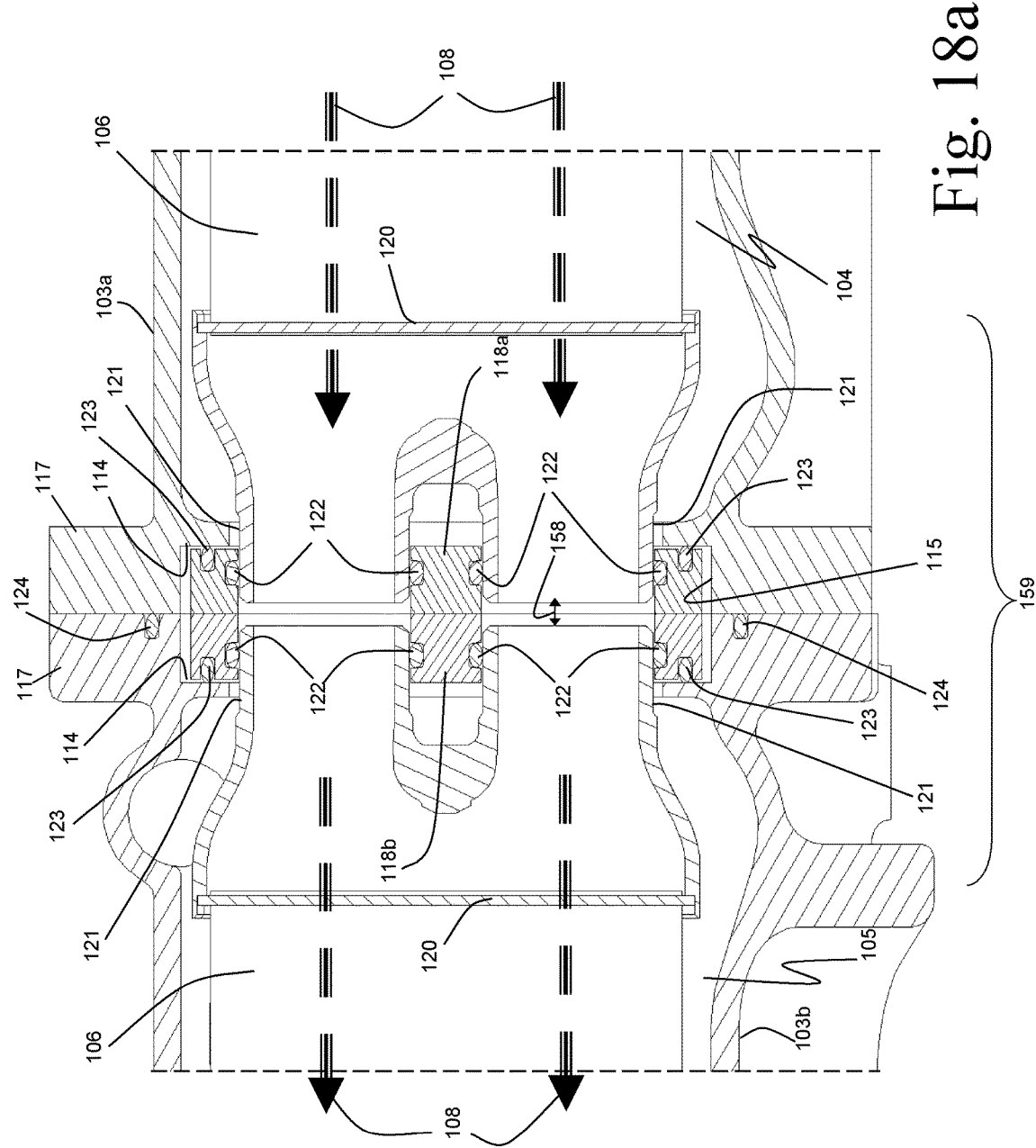
FIG. 18a is a sectional detail view of the heat exchanger of FIG. 11, taken along lines XVIII-XVIII of FIG. 11.

The heat exchange cores 104, 105 can both be assembled into respective casing sections 103a, 103b as described above, and the casing sections 103a and 103b can be joined together at the fastening locations 126 of the casing sections 103a, 103b. As shown in FIG. 18a, assembling of the casing sections 103a and 103b can mate the end faces 135 (see also, FIG. 15) of the flanges 117 of the casing sections 103a, 103b against one another. A sealing gasket 124 can also be provided in a groove 127 of at least one of the casing sections 103a, 103b in order to create a leak-tight seal between the casing sections 103a, 103b, or can otherwise be retained in place between the casing sections 103a, 103b for this purpose. Also shown in FIG. 18a are additional gaskets 123 located in grooves 130 found in at least one face of the sealing plate 118. Assembly of the casing section 103a to the casing section 103b can cause the sealing plates 118a (assembled to one of the cores 104, 105) and 118b (assembled to the other of the cores 104, 105) to contact each other and compress the gaskets 123 against the walls 114 in order to create a leak-tight seal. The fluid-tight seals created by the gaskets 122, 123, and 124, alone or in combination, can prevent fluid communication between fluids traveling along the flow paths 108, 109, and 110, and can similarly prevent leakage of those fluids out of the heat exchanger 101.

Since the location of the cylindrical flow conduits 121 of each of the cores 104, 105 can be allowed to vary relative to the casing section 103a, 103b into which the core 104, 105 is assembled, the apertures 128 of the sealing plate 118a may not be directly aligned with the apertures 128 of the sealing plate 118b. However, such non-alignment will not result in the loss of sealing between the fluid streams.

Once the heat exchanger 101 is so assembled, a continuous flow path 108 is defined from the proximal end 111 of the heat exchanger 101 to the distal end 112. The flow path 108 includes a first (upstream) section defined by the tubes 106 of the core 104, extending from the inlet header 107 of the core 104 to the outlet header 120 of the core 104, and further includes a second (downstream) section defined by the tubes 106 of the other core 105, extending from the outlet header 120 of the core 105 to the inlet header 107 of the core 105. A third intermediate section of the heat exchanger 101 is defined by a flow transitioning structure 159 fluidly connecting the upstream and downstream sections just described. The flow transitioning structure 159 extends from the header 120 of the first core 104 to the header 120 of the second core 105.

In some embodiments, the ends of the tubes 106 at both the proximate end 111 and the distal end 112 of the heat exchanger 101 are rigidly attached to the casing 102 by the attachment of the headers 107 to the casing sections 103a and 103b. In other words, this attachment between the tube ends 106 and headers 107, and the casing 102 is substantially inflexible, and does not permit relative movement between the tube ends 106 and headers 107 and the casing 102. In a similar way, in some embodiments, the flow transitioning structure 159 is rigidly attached (or is relatively inflexible, and does not permit relative movement) at either end to the ends of the tubes 106, by way of the headers 120. In contradistinction, the two ends of the flow transitioning structure 159 are flexibly connected to one another (indirectly through the sealing plates 118a, 118b) and to the casing 102, and/or are permitted to shift or otherwise move (in at least one direction, and/or at least during thermal expansion of the tubes 106 with respect to the casing 102) based upon the manner in which the flow transitioning structure 159 is assembled. Since the gaskets 122 provide a sliding seal for the cylindrical flow conduits 121 (as is required to enable assembly of the sealing plate 118 over the cylindrical flow conduits 121), and the cylindrical flow conduits 121 of core 104 can be separated from those of core 105 by a gap 158, the tube ends attached to the header 120 of either core are not prevented from displacing some amount in the tube-axial direction, and stresses at the tube-to-header joints by such displacement can be reduced or eliminated.

The flexible joint and/or relative movement enabled by the transitioning structure 159 described above can be especially beneficial in applications where a large thermal expansion differential exists, either between the tubes 106 of core 104 and the tubes 106 of core 105, or between the tubes 106 of either core and the casing 102, or both. Such thermal expansion differences have been known to cause premature failure of heat exchangers by causing high stresses, especially at tube-to-header joints. Consequently, the life of a heat exchanger 101 constructed according to some embodiments of the present invention can be beneficially enhanced.

Figure 18B:
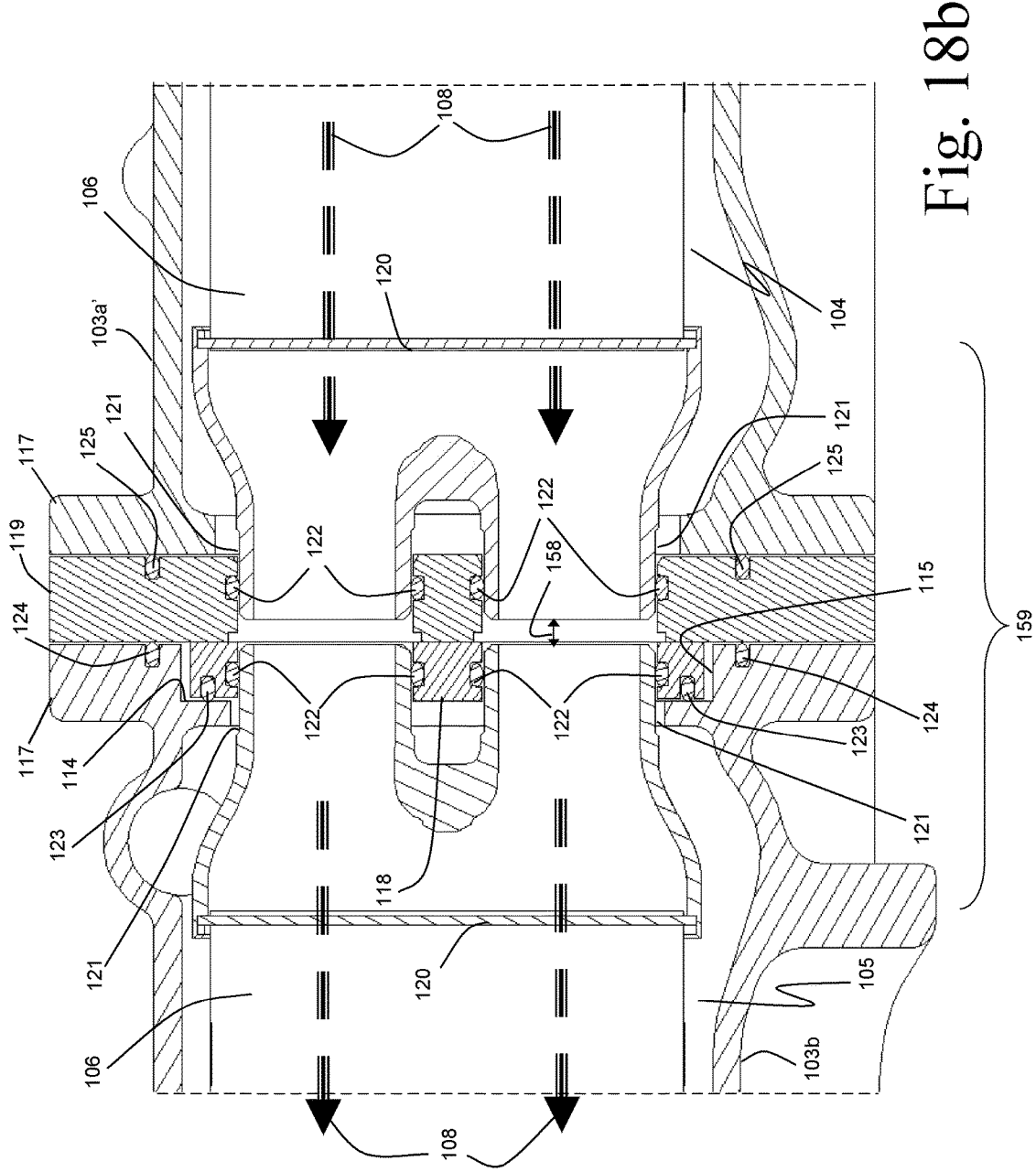
FIG. 18b is a sectional detail view of the heat exchanger of FIG. 11 according to an alternative embodiment of the present invention, also taken along lines XVIII-XVIII of FIG. 11.

Another embodiment of a heat exchanger 101 according to the present invention is illustrated in FIG. 18b. In the embodiment of FIG. 18b, the pocket 116 (see also, FIG. 15) is found only in one of the casing sections (103b). A casing section 103a' lacking the pocket 116 has replaced the previous casing section 103a. Additionally, the sealing plate 118a has been replaced with a larger sealing plate 119, and the gasket 123 found in the previous sealing plate 118a has been replaced with a similar gasket 125. In the embodiment of FIG. 18b, the sealing plate 119 is included in the joint between the flanges 117 of the casing sections 103a' and 103b. The seal between fluid flowing along the flow path 108 and fluid flowing along the flow path 110 in this embodiment can be provided solely by the gaskets 122. The new gasket 125 can prevent leakage of fluid flowing along the flow path 110 to the outside of the heat exchanger 101.

Figure 19:
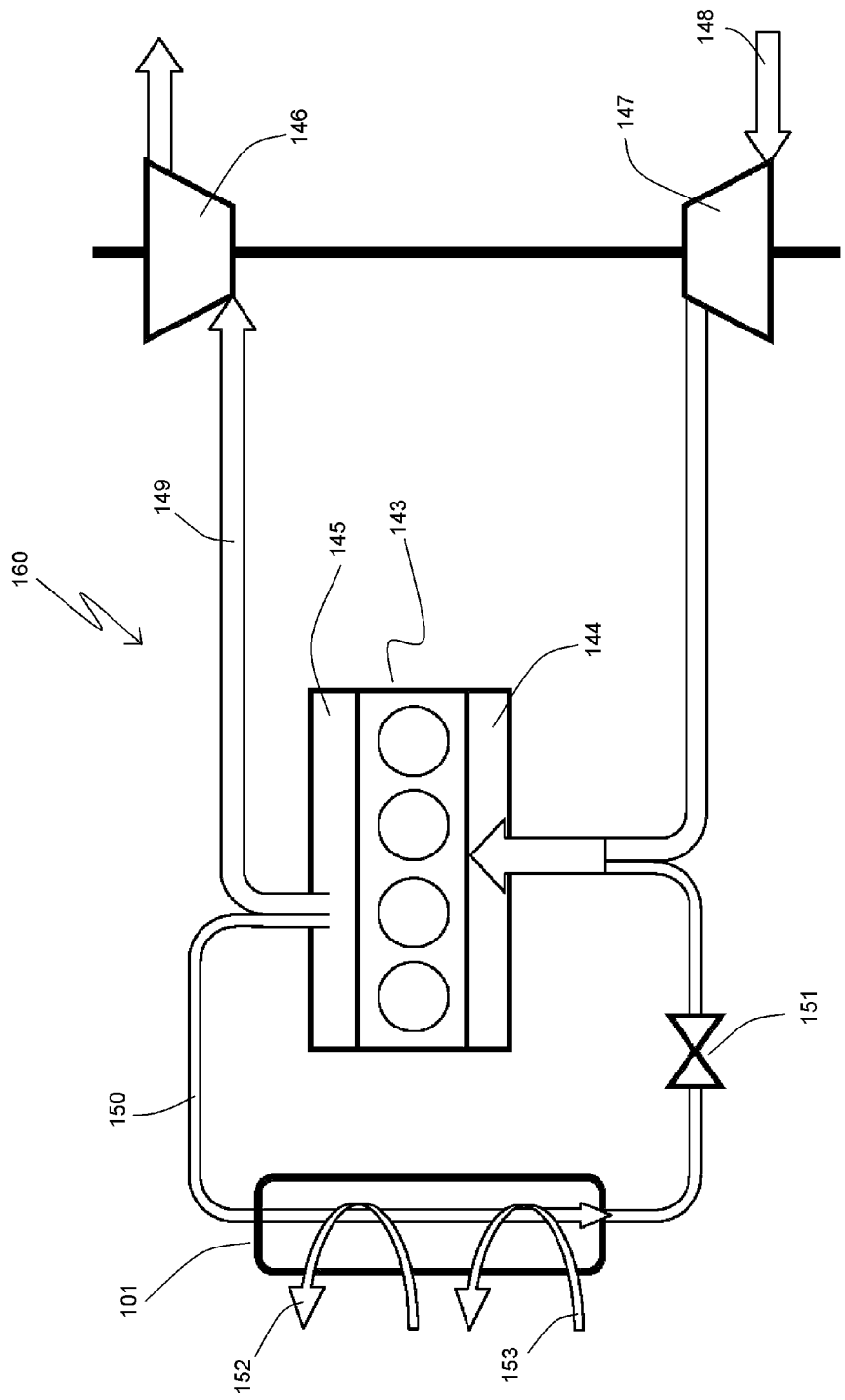
FIG. 19 is a schematic representation of an engine system including a heat exchanger embodying the present invention.

In some embodiments, the heat exchanger 101 can be provided as an EGR cooler for use in an EGR system 160, shown in FIG. 19. The EGR system 160 can include an engine 143 having an intake manifold 144 and an exhaust manifold 145, a compressor 147 coupled to an expander 146, and an EGR valve 151. A portion 149 of the hot, pressurized exhaust flow produced by the engine 143 is directed from the exhaust manifold 145 to the expander 146.

The exhaust flow 149 is expanded to a lower pressure in the expander 146, and the energy derived thereby is used to compress a fresh combustion air flow 148 in the compressor 147. The compressed air flow 148 is directed from the compressor 147 to the intake manifold 144.

With continued reference to the embodiment of FIG. 19, another portion 150 of the hot, pressurized exhaust flow produced by the engine 143 is recirculated, by way of the EGR cooler 101 and the EGR valve 151, from the exhaust manifold 145 back to the intake manifold 144, where it is combined with the compressed air flow 148. The recirculated exhaust flow 150 passes through the EGR cooler 101 along the flow path 108 (described above), is cooled by a first coolant flow 152 passing through the heat exchanger 101 along the flow path 110 (described above), and is further cooled by a second coolant flow 153 passing through the heat exchanger 101 along the flow path 109 (also described above).

In some embodiments of the EGR system 160 according to the present invention, the coolant flows 152 and 153 can be recombined at some point in the system. In still other embodiments, the coolant flows 152 and 153 can belong to segregated coolant flow circuits. Also, in some embodiments, the coolant flow 153 enters the EGR cooler 101 at a lower temperature than does the coolant flow 152, or the coolant flow 152 enters the EGR cooler 101 at a lower temperature than does the coolant flow 153.

In some embodiments, the coolant flows 152 and 153 both comprise a conventional engine coolant such as water, ethylene glycol, propylene glycol, other coolant, or any mixture of these coolants. Also, either or both of the coolant flow 152 and 153 can comprise a working fluid for a Rankine cycle waste heat recovery system.

Figure 20:
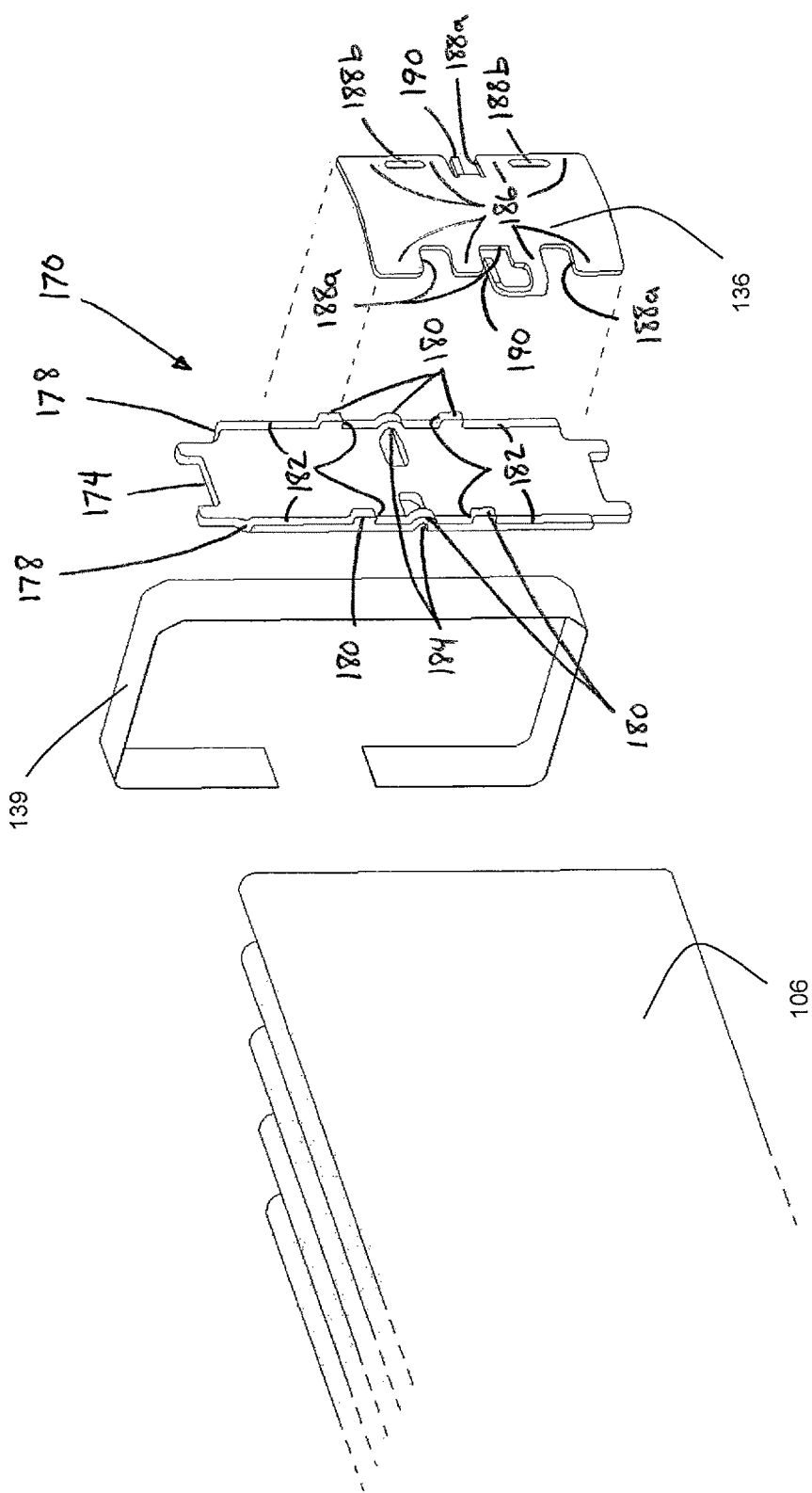
FIG. 20 is an exploded view of a spring plate and attachment structure.

FIG. 20 illustrates the spring plate 136 and attachment structure 170 in more detail. The illustrated attachment structure 170 is a sled-like structure having a base wall 174 positionable against an adjacent tube surface and upstanding side walls 178. The strap 139 extends over the base surface 174 and between the side walls 178 to connect the attachment structure 170 to the tube(s) 106.

The spring plate 136 and the attachment structure 170 include cooperating attachment features to connect the spring plate to the attachment structure 170. Each side wall 178 includes a series of projections 180 and recesses 182, and the central projection 180 defines an axial hole 184. Each side wall of the spring plate 136 includes a corresponding series of projections 186 and recesses 188. The illustrated recesses 188 include open-ended slots 188a and closed holes 188b. The spring plate 136 also includes pin members 190 having axially-extending portions.

To assemble the spring plate 136 to the attachment structure 170, the spring plate 136 is positioned with each projection 180 on the side walls 178 of the attachment structure 170 being received in the associated recess 188 and with each projection 186 on the spring plate 136 being received in the associated recess 182 on the side wall 178. The spring plate 136 is moved in an axial direction (relative to the tubes 106) opposite to the direction of insertion of the bundle of tubes 106 into the casing 102 to insert each pin member 190 into the associated hole 184 on the side walls 178. When assembled, the spring plate 136 is substantially held in position on the tube(s) 106 in the axial and both transverse directions.

It should be understood that, in other constructions (not shown), the spring plate 136 and the attachment structure 170 may include different attachment features. Also, different attachment structure may be provided. In addition, in other constructions (not shown), the spring plate 136 may be held in position in less than all of the axial and both transverse directions.

Various alternatives to the features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

Embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A heat exchanger comprising:
a bundle of tubes inserted into a housing, wherein exhaust gas flows through the tubes; a tube plate fitted onto an end of the bundle of tubes;
a diffuser having a first end joined to the tube plate and having a round shaped portion at a second end opposite the first end;
an elastic element supporting the diffuser within the housing at the round shaped portion, the elastic element permitting differences in thermal expansion between the bundle of tubes and the housing;
a coolant duct arranged between the tubes;
a grid-like securing structure joined to the bundle of tubes; and
at least one metallic spring attached to the bundle of tubes, spring force of the at least one metallic spring being directed against the housing in order to reduce the transmission of vibrations wherein the bundle of tubes and the grid-like securing structure are joined together as a stainless steel soldered structure and the at least one metallic spring is attached to the bundle of tubes after the soldering.

2. The heat exchanger of claim 1, wherein the at least one metallic spring is attached to the bundle of tubes by being attached to the grid-like securing structure.

3. The heat exchanger of claim 1, wherein the at least one metallic spring is attached to the bundle of tubes in a locking fashion.

4. The heat exchanger of claim 3, wherein said locking fashion is a positively locking fashion.

5. The heat exchanger of claim 1, wherein relative movement between the at least one metallic spring and the bundle of tubes in a tube-axial direction is limited by engagement between the at least one metallic spring and the grid-like securing structure.

6. The heat exchanger of claim 1, wherein the elastic element provides an elastic seal and an annular gap between the round shaped portion of the diffuser and the housing.

7. The heat exchanger of claim 1, wherein the at least one metallic spring includes a planar section extending in the tube-axial direction and disposed against a surface of the tubes, and an outwardly curved section joined to and extending from the planar section.

8. The heat exchanger of claim 1, wherein the at least one metallic spring includes a first metallic spring and a second metallic spring spaced apart from the first metallic spring.

9. A heat exchanger comprising:
a bundle of tubes inserted into a housing, wherein exhaust gas flows through the tubes; a tube plate fitted onto an end of the bundle of tubes;
a diffuser having a first end joined to the tube plate and having a round shaped portion at a second end opposite the first end;
an elastic element supporting the diffuser within the housing at the round shaped portion, the elastic element permitting differences in thermal expansion between the bundle of tubes and the housing;
a coolant duct arranged between the tubes;
a grid-like securing structure joined to the bundle of tubes; and
at least one metallic spring attached to the bundle of tubes, spring force of the at least one metallic spring being directed against the housing in order to reduce the transmission of vibrations, wherein the at least one metallic spring includes a first metallic spring and a second metallic spring spaced apart from the first metallic spring, and, wherein the bundle of tubes has a first side and a different second side, the first metallic spring having a planar section disposed against the first side of the bundle and the second metallic spring having a planar section disposed against a second side of the bundle.

10. The heat exchanger of claim 9, wherein the first side of the bundle and the second side of the bundle are opposite sides.

11. A heat exchanger comprising: a housing;
a bundle of flat tubes inserted into the housing, the flat tubes being arranged into one or more rows, adjacent ones of the flat tubes in each row being spaced apart to define coolant ducts;
an elastic element arranged at an end of the bundle of flat tubes, the elastic element permitting differences in thermal expansion in a tube-axial direction between the bundle and the housing;
at least one grid-like securing structure joined to the bundle of flat tubes, grid rods from the at least one grid-like securing structure arranged between adjacent ones of the flat tubes; and
a plurality of metallic springs attached to the bundle of flat tubes, each of the springs including a planar section disposed against a surface of at least one of the flat tubes and an outwardly curved section joined to and extending from the planar section spring, spring force of the springs being directed against the housing in order to reduce the transmission of vibrations.

12. The heat exchanger of claim 11, wherein the plurality of metallic springs are attached to the bundle of flat tubes in a locking fashion.

13. The heat exchanger of claim 12, wherein the locking fashion is a positively locking fashion.

14. The heat exchanger of claim 11, wherein the plurality of metallic springs are attached to the bundle of flat tubes by way of the at least one grid-like securing structure.

15. The heat exchanger of claim 11, wherein the plurality of metallic springs includes a first metallic spring and a second metallic spring, the first and second metallic springs being arranged on adjacent sides of the bundle, the planar section of the first metallic spring being disposed against a flat surface of one of the flat tubes, the planar section of the second metallic spring being disposed against rounded end surfaces of at least two of the flat tubes.

16. The heat exchanger of claim 11, wherein the flat tubes and at least one grid-like securing structure are joined together in a soldering process to form the bundle, the plurality of metallic springs being attached to the bundle after the soldering process.

17. The heat exchanger of claim 9, wherein the at least one metallic spring is attached to the bundle of tubes by being attached to the grid-like securing structure.

18. The heat exchanger of claim 9, wherein the at least one metallic spring is attached to the bundle of tubes in a locking fashion.

19. The heat exchanger of claim 9, wherein the bundle of tubes and the grid-like securing structure are joined together as a stainless steel soldered structure and the at least one metallic spring is attached to the bundle of tubes after the soldering.

20. The heat exchanger of claim 9, wherein the elastic element provides an elastic seal and an annular gap between the round shaped portion of the diffuser and the housing.

* * * * *